(12) United States Patent
Tomeba et al.

(10) Patent No.: US 9,673,881 B2
(45) Date of Patent: Jun. 6, 2017

(54) TERMINAL DEVICE, BASE STATION DEVICE, WIRELESS COMMUNICATION SYSTEM, RECEPTION METHOD, AND INTEGRATED CIRCUIT

(71) Applicant: Sharp Kabushiki Kaisha, Osaka-shi, Osaka (JP)

(72) Inventors: Hiromichi Tomeba, Osaka (JP); Takashi Onodera, Osaka (JP); Alvaro Ruiz Delgado, Osaka (JP); Minoru Kubota, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 146 days.

(21) Appl. No.: 14/434,161

(22) PCT Filed: Oct. 1, 2013

(86) PCT No.: PCT/JP2013/076666
§ 371 (c)(1),
(2) Date: Apr. 8, 2015

(87) PCT Pub. No.: WO2014/057840
PCT Pub. Date: Apr. 17, 2014

(65) Prior Publication Data
US 2015/0270884 A1 Sep. 24, 2015

(30) Foreign Application Priority Data
Oct. 10, 2012 (JP) .................. 2012-224950

(51) Int. Cl.
*H04W 4/00* (2009.01)
*H04B 7/06* (2006.01)
(Continued)

(52) U.S. Cl.
CPC ......... *H04B 7/0626* (2013.01); *H04B 7/0417* (2013.01); *H04B 7/0452* (2013.01);
(Continued)

(58) Field of Classification Search
CPC .. H04B 7/0626; H04B 7/0417; H04B 7/0452; H04B 7/0456; H04B 7/0845; H04W 72/0406

See application file for complete search history.

(56) References Cited

U.S. PATENT DOCUMENTS 7,027,523 B2 4/2006 Jalali et al.
7,333,560 B2 2/2008 Jalali et al.
(Continued)

FOREIGN PATENT DOCUMENTS

JP 2004-534456 A 11/2004
JP 2011-233944 A 11/2011

OTHER PUBLICATIONS

Official Communication issued in International Patent Application No. PCT/JP2013/076666, mailed on Dec. 17, 2013.
(Continued)

*Primary Examiner* — Lonnie Sweet
(74) *Attorney, Agent, or Firm* — Keating & Bennett, LLP

(57) ABSTRACT

In a wireless communication system that performs non-linear pre-coding, degradation in transmission performance due to a feedback error is improved. The terminal device according to the present invention is a terminal device which receives radio signals that are space-multiplexed and on which non-linear pre-coding is performed, from a base station device including multiple antennas, the terminal device including: a channel state estimator 53 that estimates channel state information on a channel between the terminal device and the base station device; a terminal antenna module 51 that acquires a linear filter that is calculated in the base station device; and a channel equalization module 57 that performs channel equalization processing on the radio signals that are received at a first point in time, based on the
(Continued)

channel state information at a second point in time that precedes the first point in time and on the linear filter.

5 Claims, 12 Drawing Sheets

(51) Int. Cl.
   *H04B 7/0417* (2017.01)
   *H04B 7/0452* (2017.01)
   *H04B 7/0456* (2017.01)
   *H04B 7/08* (2006.01)
   *H04W 72/04* (2009.01)

(52) U.S. Cl.
   CPC ......... *H04B 7/0456* (2013.01); *H04B 7/0845* (2013.01); *H04W 72/0406* (2013.01)

(56) References Cited

U.S. PATENT DOCUMENTS

| | | |
|---|---|---|
| 7,729,444 B2 | 6/2010 | Jalali et al. |
| 8,121,217 B2 | 2/2012 | Jalali et al. |
| 8,897,122 B2 | 11/2014 | Nakano et al. |
| 2003/0002450 A1 | 1/2003 | Jalali et al. |
| 2006/0072677 A1* | 4/2006 | Kwak ............... H04B 7/0417 375/260 |
| 2006/0109926 A1 | 5/2006 | Jalali et al. |
| 2007/0086540 A1* | 4/2007 | Chae ............... H04B 7/0697 375/267 |
| 2008/0107048 A1 | 5/2008 | Jalali et al. |
| 2008/0192856 A1* | 8/2008 | Jongren ............ H04B 7/0617 375/267 |
| 2010/0046650 A1* | 2/2010 | Jongren ............ H04B 7/0413 375/260 |
| 2010/0074152 A1 | 3/2010 | Jalali et al. |
| 2013/0003641 A1 | 1/2013 | Nakano et al. |
| 2013/0267240 A1* | 10/2013 | Fu ............... H04L 1/0026 455/452.2 |

OTHER PUBLICATIONS

Hochwald et al., "A Vector-Perturbation Technique for Near-Capacity Multiantenna Multiuser Communication—Part II: Perturbation," IEEE Transactions on Communications, vol. 53, No. 3, Mar. 2005, pp. 537-544.

Joham et al., "MMSE Approaches to Multiuser Spatio-Temporal Tomlinson-Harashima Precoding," Proc. 5th Int. ITG Conf. on Source and Channel Coding, Jan. 2004, 8 pages.

Vermani et al., "Interference Cancellation for Downlink MU-MIMO," IEEE 802.11-09/1234r1, Mar. 15, 2010, 22 pages.

* cited by examiner

TERMINAL DEVICE, BASE STATION DEVICE, WIRELESS COMMUNICATION SYSTEM, RECEPTION METHOD, AND INTEGRATED CIRCUIT

TECHNICAL FIELD

The present invention relates to a technology of performing multi-user multiple input multiple output transfer.

BACKGROUND ART

In a wireless communication system, in order to provide various broadband information services, it is desirable at all times that transfer speed is improved. It is possible to realize an improvement in the transfer speed by broadening a communication bandwidth, but because there is a limit in an available frequency band, an improvement in frequency efficiency is indispensable. As a technology for greatly improving frequency efficiency, a multiple input multiple output (MIMO) technology that performs wireless transfer using multiple transmit and receive antennas is attracting attention, and is practically used in a cellular system, a wireless LAN system, or the like. An amount of improvement in the frequency efficiency due to the MIMO technology is proportional to the number of the transmit and receive antennas. However, there is a limit in the number of the receive antennas that may be in a terminal device. Then, multi-user MIMO (MU-MIMO) in which multiple terminal devices that make connections at the same time are regarded as a virtual large-scale antenna array, and transmission signals from the base station device to each terminal device are space-multiplexed is effective in improving the frequency efficiency.

In MU-MIMO, because the transmission signals that are destined for the terminal devices, respectively, are received in the terminal device, causing inter-user-interference (hereinafter referred to as IUI), IUI needs to be suppressed. For example, in Long Term Evolution that is employed as one of the 3.9-th mobile wireless communication systems, linear precoding is employed in which multiplication by a linear filter that is calculated based on channel state information that is notified by each terminal device is performed in advance in the base station device and thus the IUI is suppressed.

Furthermore, as a method of realizing MU-MIMO with which much greater improvement in frequency efficiency can be expected, a MU-MIMO technology that uses non-linear precoding in which non-linear processing is performed on the side of the base station device has attracted attention. In a case where a modulo operation is possible in the terminal device, it is possible to add a perturbation vector of which an element is a complex number (a perturbation term) that results from multiplying an arbitrary Gaussian integer by a fixed real number, to the transmission signal.

Then, if the perturbation vector is appropriately set according to a channel state between the base station device and each of multiple user devices, it is possible to reduce the needed transmission power more greatly than in the linear pre-coding. As the non-linear pre-coding, vector perturbation (VP) disclosed in NPL 1 or Tomlinson Harashima precoding (THP) disclosed in NPL 2, which are schemes with which optimal transmission performance can be realized, is well known.

Incidentally, because the pre-coding is performed according to the channel state between the base station and the terminal device, the precision of the pre-coding depends greatly on the precision of channel state information (CSI) which the base station can be aware of. In the wireless communication system that depends on frequency division duplex that uses different carrier frequencies in downlink transfer and uplink transfer, the CSI estimated by the terminal device is fed back to the base station device, and thus the base station device can be aware of the CSI. However, there is a likelihood that an error will occur between the CSI that the base station device can be aware of and actual CSI. This problem is briefly described referring to FIG. 11.

FIG. 11 is a sequence chart illustrating a situation of communication between the base station device that performs the pre-coding and a terminal device. First, the base station device transmits a reference signal for estimating the CSI to the terminal device (Step S1). Furthermore, the base station device generates transmission data and a demodulation reference signal (Step S2). Because the reference signal is already known to the base station device and the terminal device, the CSI can be estimated based on the received reference signal (Step S3).

However, practically, because noise is necessarily applied to the received signal, an error occurs between the estimated CSI and real CSI. The terminal device converts the estimated CSI into information that is available for notification to the base station device, and notifies the base station device of the resulting information (Step S4). As the information that is available for the notification, information that results from quantizing the estimated information directly into digital information, a number indicating a code listed in a code book that is shared between the base station device and the terminal device, or the like, is given. The base station device restores the CSI with the notified information, but an error occurs between the restored CSI and the real CSI, too. The error between the real CSI and the CSI that the base station device is finally made to be aware of is hereinafter referred to as a quantization error. Thereafter, in the base station device, the pre-coding is performed based on the restored CSI (Step S5), and the data transmission to the terminal device is performed (Step S6).

When receiving data from the base station device, the terminal device performs channel estimation for demodulation (Step S7), performs channel equalization (spatial signal detection processing) (Step S8), and demodulates the transmit data (Step S9). At this point, because the terminal device estimates the CSI, a fixed processing delay time (also referred to as round trip delay) occurs until the base station device performs the pre-coding processing and transmits a signal. Normally, because time selectivity is present in a channel, an error occurs between the CSI that is propagated by a signal on which the pre-coding is performed, and the CSI estimated by the terminal device. The CSI error that occurs depending on the time selectivity in the channel is hereinafter referred to as a time change error and the quantization error and the time change error are hereinafter collectively referred to as a feedback error. Because the feedback error is present in the CSI that the base station device can be aware of, it is extremely difficult for the base station device to acquire high-precision CSI.

On the other hand, in a wireless communication system that depends on time division duplex that uses the same carrier frequencies in the downlink transfer and the uplink transfer, the feedback error occurs as well, as is the case with the frequency division duplex. This problem is briefly described referring to FIG. 12. FIG. 12 is a sequence chart illustrating a situation of the communication between the base station device that performs the pre-coding and the terminal device. In the time division duplex, the transmission is performed in a state where the uplink transfer and the downlink transfer are divided in terms of time. First, the uplink transfer from the terminal device to the base station device is performed (Step T1). At this time, a reference signal for signal demodulation is included in a signal for the uplink transfer, and the base station device acquires the CSI from the reference signal and performs signal demodulation (Step T2).

Subsequently, it is considered that the base station device performs the pre-coding on a signal for the downlink transfer. At this time, because duality is present between a channel for the uplink, and a channel for the downlink in the time division duplex, the base station device can perform the pre-coding based on the CSI that was acquired some time ago to demodulate the signal for the uplink transfer (Step T3). Then, data is transmitted to the terminal device (Step T4). On the other hand, in the terminal device, the channel estimation and the downlink signal demodulation are performed (Step T5).

However, generally, because multiple signals for the uplink transfer and multiple signals for the downlink transfer are alternately transmitted, the time change error is present between the CSI that is propagated by a signal that is transmitted, which is in the latter half of the multiple signals for the downlink transfer, and the CSI that is used in the pre-coding. Furthermore, because the duality is present in the channel itself and on the other hand, the duality is not present in analog circuits of the base station device and the terminal device, the CSI for the uplink and the CSI for the downlink are not necessarily the same. CSI errors that occur in this manner are hereinafter collectively referred to as the feedback error.

As described above, in order to improve the channel performance of the pre-coding transfer in an environment where an influence of the CSI feedback error is great, NPL 3 discusses a method in which the terminal device estimates channel state information anew at a point in time at which a reception signal on which the pre-decoding is performed is received in the terminal device, and based on the channel state information, performs approximate channel equalization processing anew, thereby lessening degradation in the channel performance due to the feedback error. However, in the method in NPL 3, a case where only one data stream is sent to each terminal device is assumed and only the linear pre-coding is considered for the pre-coding.

CITATION LIST

Non Patent Literature

NPL 1: B. M. Hochwald, et. al., "A vector-perturbation technique for near-capacity multiantenna multiuser communication-Part II: Perturbation," IEEE Trans. Commun., Vol. 53, No. 3, pp. 537-544, March 2005.
NPL 2: M. Joham, et. al., "MMSE approaches to multiuser spatio-temporal Tomlinson-Harashima precoding", Proc. 5th Int. ITG Conf. on Source and Channel Coding, Erlangen, Germany, January 2004.
NPL 3: IEEE 802.11-09/1234r1, "Interference cancellation for downlink MU-MIMO," Qualcomm, March 2010.

SUMMARY OF INVENTION

Technical Problem

In a transfer system that is based on the non-linear pre-coding, in order to realize high frequency efficiency, degradation in the channel performance that occurs due to the CSI feedback error needs to be dealt with. However, in the method in NPL 3, it is difficult to transmit multiple data streams to each terminal device, and the pre-decoding that can be applied is also limited to the linear pre-decoding. To be more precise, in a case where the multiple data streams are transmitted to each terminal device and the non-linear pre-coding is performed, the method of lessening the degradation in transmission performance due to the feedback error has not yet been made clear.

An object of the present invention, which is made in view of this situation, is to provide a terminal device, a base station device, a wireless communication system, a reception method, and an integrated circuit, all of which are for lessening degradation in transmission performance due to a feedback error in a wireless communication system that performs non-linear pre-coding.

Solution to Problem (1) In order to accomplish the object described above, the present invention is contrived to provide the following means. That is, the terminal device of the present invention is a terminal device that receives radio signals on which non-linear pre-coding is performed and which are space-multiplexed, from a base station device including multiple antennas, the terminal device including: a channel state estimator that estimates channel state information on a channel between the terminal device and the base station device; a control information acquisition module that acquires a linear filter that is calculated in the base station device; and a channel equalization module that performs channel equalization processing on the radio signals that are received at a first point in time, based on the channel state information at a second point in time that precedes the first point in time and on the linear filter.

(2) Furthermore, the terminal device of the present invention further includes: a feedback information generation module that generates feedback information which includes the channel state information at the second point in time; and a wireless transmission module that notifies the base station device of the feedback information.

(3) Furthermore, in the terminal device of the present invention, the wireless transmission module transmits a reference signal to the base station device.

(4) Furthermore, in the terminal device of the present invention, the channel equalization module performs channel equalization processing on the radio signals received at the first point in time, based on a channel gain at the second point in time between the terminal device and the base station device and on a channel estimate that is obtained from the linear filter calculated in the base station device.

(5) Furthermore, in the terminal device of the present invention, the linear filter is calculated based on the channel state information at the second point in time.

(6) Furthermore, the terminal device of the present invention is a terminal device that receives radio signals on which non-linear pre-coding is performed and which are space-multiplexed, from a base station device including multiple antennas, the terminal device including: a channel state estimator that estimates channel state information on a channel between the terminal device and the base station device; a control information acquisition module that acquires a linear filter that is calculated in the base station device; and a channel equalization module that performs channel equalization processing on the radio signals received from the base station device, based on channel state information that is the same as the channel state information used in the calculation of the linear filter in the base station device and on the linear filter.

(7) Furthermore, the base station device of the present invention is a base station device that includes multiple antennas and that transmits radio signals on which non-linear pre-coding is performed and which are space-multiplexed, to the multiple terminal devices according to any one of (1) to (6) at a first point in time, the base station device including: a non-linear pre-coding module that performs non-linear pre-coding on a signal that is transmitted to each of the terminal devices based on channel state information at a second point in time that precedes the first point in time; a control information generation module that generates control information which includes information indicating a linear filter; and a transmission module that transmits the radio signals and the control information to each of the terminal devices.

(8) Furthermore, the base station device of the present invention further includes: an acquisition module that acquires feedback information which includes channel state information at the second point in time; and a channel state information acquisition module that acquires the channel state information at the second point in time from the feedback information, in which the non-linear pre-coding module performs the non-linear pre-coding on the signal that is transmitted to each of the terminal devices, based on the channel state information at the second point in time.

(9) Furthermore, the base station device of the present invention further includes: a reception module that, at the second point in time, receives a radio signal that includes a reference signal from the terminal device; and a reference signal separation module that separates the reference signal from the received radio signal; and an estimator that estimates channel state information on a channel between the base station device and the terminal device at the second point in time based on the reference signal, in which the non-linear pre-coding module performs the non-linear pre-coding on a signal that is transmitted to each of the terminal devices based on the channel state information on the channel between the base station device and the terminal device at the second point in time.

(10) Furthermore, the wireless communication system of the present invention is a wireless communication system including the terminal device according to (1) and the base station device according to (7).

(11) Furthermore, the reception method of the present invention is a reception method for use in a terminal device that receives radio signals on which non-linear pre-coding is performed and which are space-multiplexed, from a base station device including multiple antennas, the reception method at least comprising: a step of estimating channel state information on a channel between the terminal device and the base station device; a step of acquiring a linear filter that is calculated in the base station device; and a step of performing channel equalization processing on the radio signals that are received at a first point in time, based on the channel state information at a second point in time that precedes the first point in time and on the linear filter.

(12) Furthermore, an integrated circuit of the present invention is an integrated circuit that is built into a terminal device and thus causes the terminal device to perform multiple functions, the circuit causing the terminal device to perform a series of functions comprising: a function of receiving radio signals on which non-linear pre-coding is performed and which are space-multiplexed, from a base station device including multiple antennas; a function of estimating channel state information on a channel between the terminal device and the base station device; a function of acquiring a linear filter that is calculated in the base station device; and a function of performing channel equalization processing on the radio signals that are received at a first point in time, based on the channel state information at a second point in time that precedes the first point in time and on the linear filter.

Advantageous Effects of Invention

According to the present invention, in the wireless communication system that performs the non-linear pre-coding, because the degradation in the transmission performance due to the feedback error is lessened, it is possible to contribute to a great improvement in the frequency efficiency.

DESCRIPTION OF EMBODIMENTS

Figure 1:
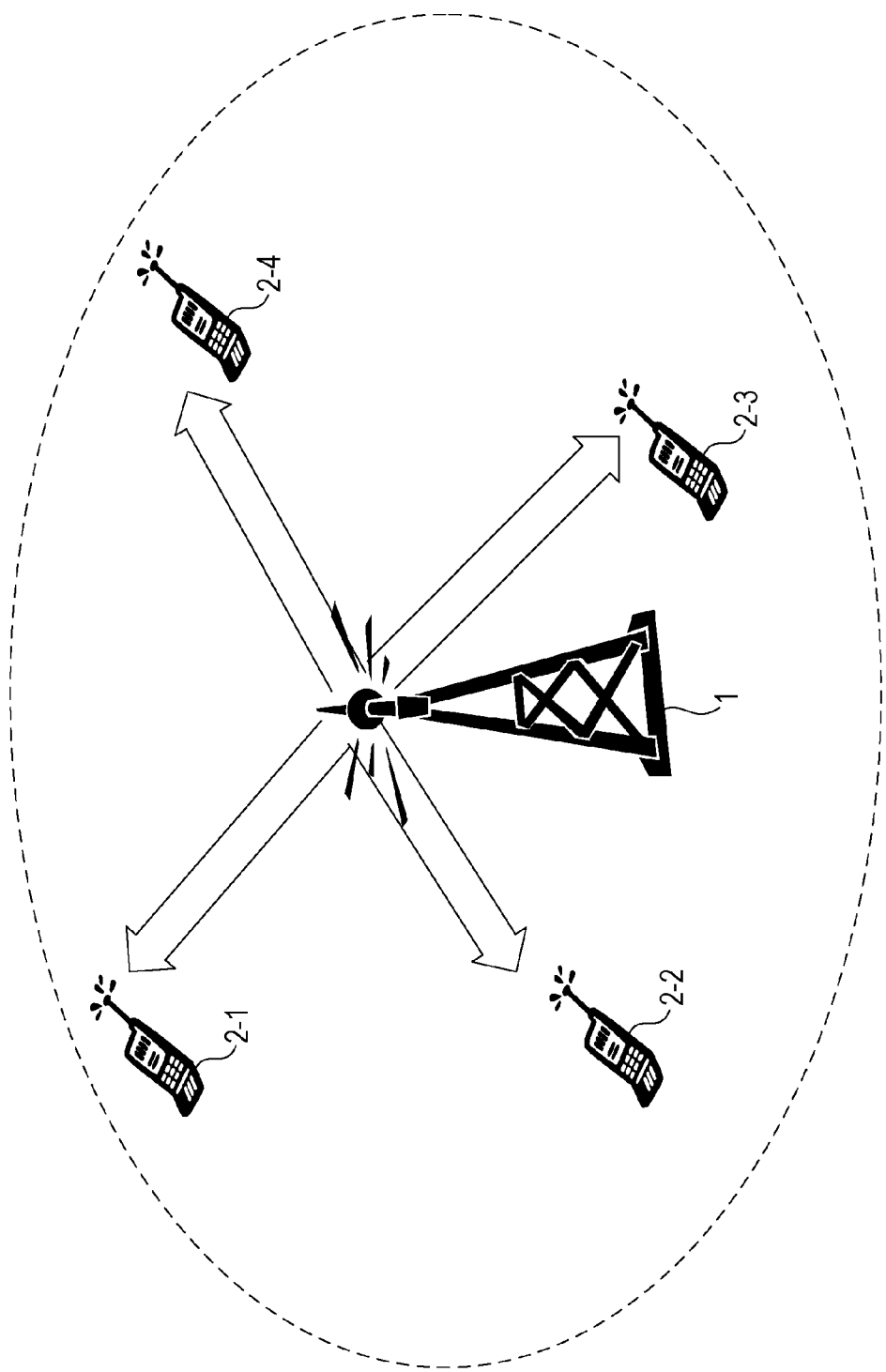
FIG. 1 is a diagram schematically illustrating a wireless communication system according to a first embodiment of the present invention.

A wireless communication system according to an embodiment of the present invention will be described below referring to the drawings. Moreover, describing matters according to the present embodiment is an aspect of an understanding of the invention, and therefore contents of the invention are not interpreted subject to being limited to the present embodiment. Furthermore, unless otherwise specified, $A^T$ is set to indicate a transposed matrix of a matrix A, $A^H$ an adjoint (Hermitian transpose) matrix of the matrix A, $A^{-1}$ an inverse matrix of the matrix A, $A^+$ a pseudo (or general)-inverse matrix of the matrix A, diag(A) a diagonal matrix that results from extracting only a diagonal component of the matrix A, floor(c) a floor function that returns a maximum Gaussian integer of which a real part and an imaginary part do not exceed a value of a real part of a complex number c and a value of an imaginary part of the complex number c, respectively, E[x] an ensemble average of a random variable, abs(c) a function that returns an amplitude of the complex number c, angle(c) a function that returns an argument of the complex number c, ∥a∥ a norm of a vector a, x % y a remainder that results from dividing an integer x by an integer y, and $_nC_m$ the total number of combinations that results from selecting m different elements from among n different elements. Furthermore, [A; B] is set to indicate a matrix that results from adding a matrix A and a matrix B in the row direction, and [A, B] a matrix that results from adding the matrix A and the matrix B in the column direction. Furthermore, Z[i] is set to indicate a set of all Gaussian integers. Moreover, a Gaussian integer indicates a complex number of which a real part and an imaginary part are expressed as integers.

First Embodiment

FIG. 1 is a diagram schematically illustrating a wireless communication system according to a first embodiment of the present invention. The first embodiment is for MU-MIMO transfer in which U terminal devices 2 (which are also referred to as wireless reception devices, indicate terminal devices 2-1 to 2-4 in FIG. 1, and are hereinafter collectively also referred to as terminal devices) each of which has $N_r$ receive antennas, are connected to a base station device 1 (which is also referred to as a wireless transmission device) that has $N_t$ transmit antennas and in which non-linear pre-coding is available. L pieces of data are set to be transmitted to each of the terminal devices 2-1 to 2-4 at the same time (the number of pieces of data that are transmitted at the same time is also referred to as a ranking number), and $U \times L = N_t$ and $L = N_r$ are set to be established.

For simplicity, the number of receive antennas of each of the terminal devices 2-1 to 2-4 and both of the ranking number are described below as being set to be the same, that is, $L = N_r = 1$, but the number of receive antennas and the ranking number may differ from one terminal to another. Furthermore, if $U \times L \leq N_t$ and $L \leq N_r$ are satisfied, the ranking number and the number of receive antennas also do not need to be same.

Orthogonal Frequency Division Multiplexing (OFDM) that has No subcarriers is assumed to be a transfer scheme. However, unless otherwise specified, signal processing that is described below is set to be performed in every subcarrier. Furthermore, Frequency Division Duplex (FDD) is assumed to be a duplex scheme. The base station device 1 is set to acquire channel state information (CSI) on each terminal device using control information that is notified by each of the terminal devices 2-1 to 2-4 and is set to perform pre-coding on transmit data for each subcarrier based on the channel state information.

First, the CSI between the base station device 1 and the terminal devices 2-1 to 2-4 is defined. According to the present embodiment, a semi-static frequency selective fading channel is assumed. At this point, being semi-static is assumed to mean that a channel is not changed within 1 OFDM signal. A channel matrix H(k,t) is defined as in Equation (1) when a complex channel gain at a k-th subcarrier is set to $h_{u,m,n}(k,t)$, in a t-th OFDM signal between an n-th transmit antenna (n=1 to $N_t$) and a m-th receive antenna (m=1 to $N_r$) of a u-th terminal device (u=1 to U).

[Math 1]

$$\begin{cases} H(k,t) = \begin{pmatrix} h_1(k,t) \\ h_2(k,t) \\ \vdots \\ h_U(k,t) \end{pmatrix} \\ h_u(k,t) = \begin{pmatrix} h_{u,1,1}(k,t) & \cdots & h_{u,1,N_t}(k,t) \\ \vdots & \ddots & \vdots \\ h_{u,N_r,1}(k,t) & \cdots & h_{u,N_r,N_t}(k,t) \end{pmatrix} \end{cases} \quad (1)$$

$h_u(k,t)$ indicates a $N_r \times N_t$ matrix that is configured from the complex channel gain that is observed in the u-th terminal device. According to the present embodiment, unless otherwise specified, the CSI indicates a matrix that is configured from the complex channel gain. However, a spatial correlation matrix or a matrix in which linear filters listed in a code book that is shared in advance between the base station device and each terminal device are put side by side is regarded as CSI, and it is also possible to perform signal processing described below. Furthermore, in a case where the terminal device 2 notifies the base station device 1 of an eigenvector that is obtained by performing a single value decomposition (or an eigenvalue decomposition) on an estimated channel matrix, the base station device 1 may regard a matrix in which the eigenvectors are put side by side, as the CSI. The u-th terminal device is described below as estimating CSI $h_u(k, t_1)$ at a point in time $t_1$. However, according to the present embodiment, the u-th terminal device is set to be able to notify the base station device of CSI $h_u(k,t_1)$ in a state of being close to an ideal value.

[Base Station Device]

Figure 2:
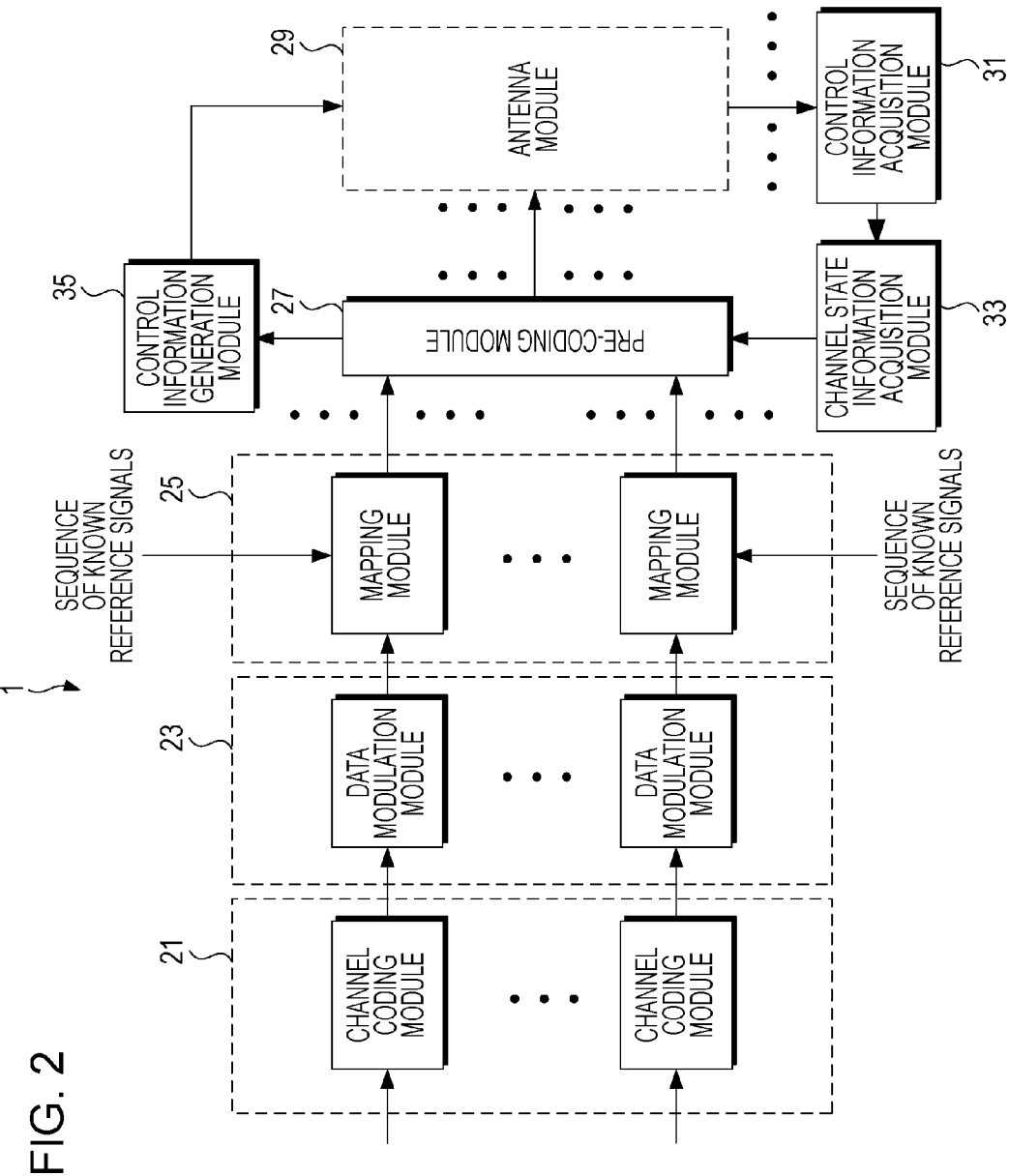
FIG. 2 is a block diagram illustrating a configuration of a base station device according to the first embodiment of the present invention.

FIG. 2 is a block diagram illustrating a configuration of a base station device according to a first embodiment of the present invention. As illustrated in FIG. 2, the base station device 1 is configured to include a channel coding module 21, a data modulation module 23, a mapping module 25, a pre-coding module (a non-linear pre-coding module) 27, an antenna module 29, a control information acquisition module 31, a channel state information acquisition module 33, and a control information generation module 35. As many pre-coding modules 27 as the number $N_c$ of subcarriers are present and as many antenna modules as the number $N_t$ of antenna modules 29 are present.

First, the control information acquisition module 31 acquires pieces of control information that are notified by each of the terminal devices 2-1 to 2-4 in a connected state, and outputs information associated with the channel state information, among the pieces of control information, to the channel state information acquisition module 33. In the channel state information acquisition module 33, based on information being input, channel matrix $H(k,t_1)$ is acquired and is output to the pre-coding module 27.

Subsequently, the channel coding module 21 performs channel coding on a sequence of pieces of transmit data that are destined for each of the terminal devices 2-1 to 2-4, and then the data modulation module 23 performs digital data modulation such as QPSK or 16 QAM. The data modulation module 23 inputs a data signal on which the data modulation is performed into the mapping module 25.

The mapping module 25 performs mapping (also referred to as scheduling or resource allocation) that arranges each piece of data in designated radio resources (also referred to as resource elements, or simply resources). At this point, the radio resources mainly indicate frequencies, time, codes, and spaces. It is preferable that the radio resources being used are determined based on reception quality that is measured in the terminal devices 2-1 to 2-4, orthogonality of space-multiplexed channels of the terminals, or the like. According to the present embodiment, the radio resources being used are set to be determined in advance, and are set to be recognizable in both of the base station device 1 and each of the terminal devices 2-1 to 2-4. Moreover, the mapping module 25 also performs multiplexing of a known reference signal sequence for performing channel estimation in each of the terminal devices 2-1 to 2-4.

Reference signals that are destined for each of the terminal devices 2-1 to 2-4 are set to be multiplexed in such a manner that the reference signals are orthogonal to one another so that the reference signal can be separated in the terminal devices that receive the reference signals. Furthermore, CSI-reference signals (CSI-RS) that are reference signals for channel estimation are set to be multiplexed, but a configuration in which other reference signals are also multiplexed may be possible. The CSI-RS is for estimating the channel matrix that is measured in each terminal device. According to the present invention, the mapping module 25 is set to map a data signal and a CSI-RS in such a manner that the data signal and the CSI-RS are transmitted at different times or on different channels. Furthermore, the mapping module 25 arranges the CSI-RS's in such a manner that the CSI-RS's are orthogonal to one another. The mapping module 25 inputs pieces of mapped data information and the like into the pre-coding module 27 for subcarriers that correspond to the pieces of mapped data information, respectively.

Figure 3:
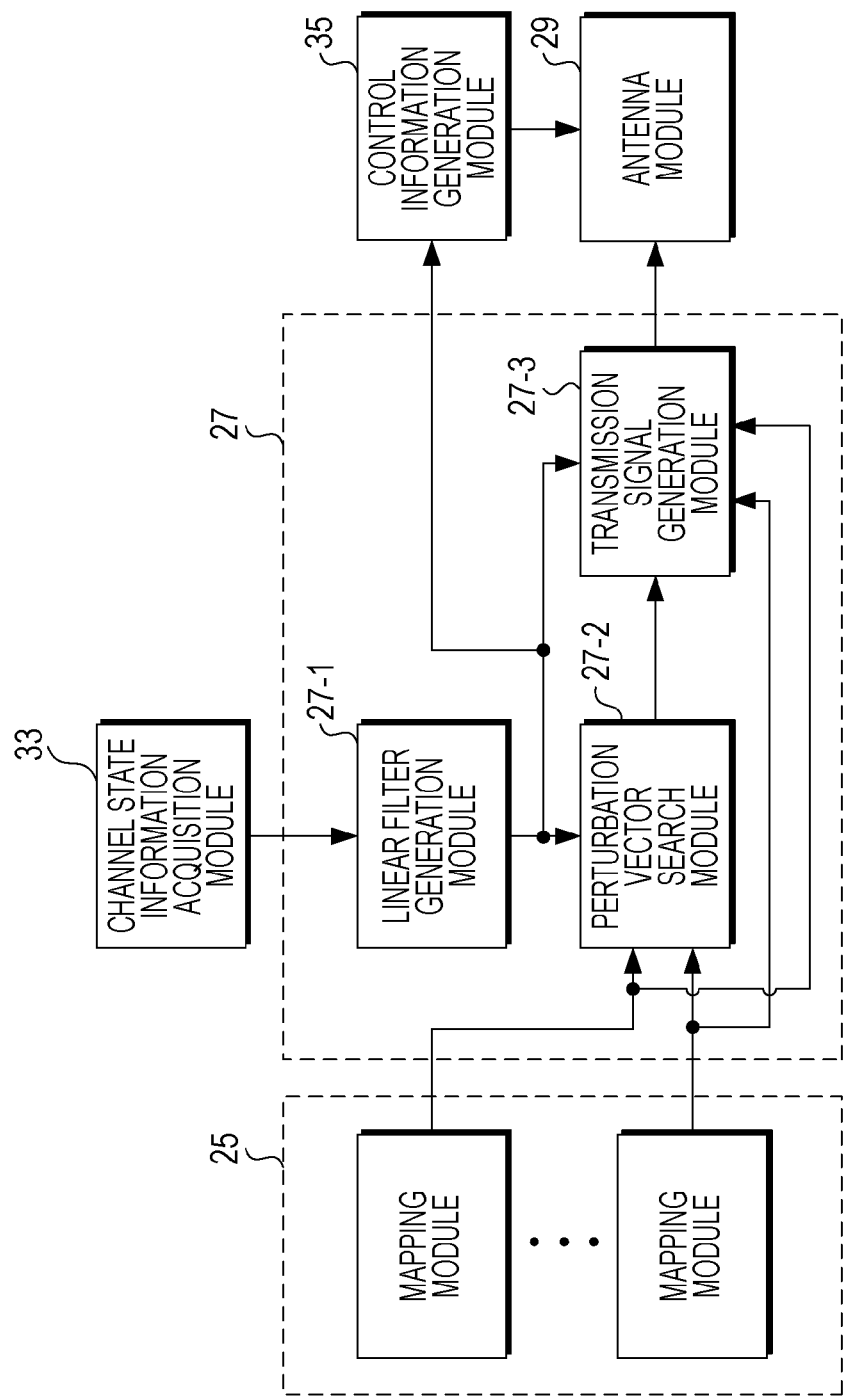
FIG. 3 is a block diagram illustrating a device configuration of a pre-coding module 27 according to the first embodiment of the present invention.

FIG. 3 is a block diagram illustrating a device configuration of the pre-coding module 27 according to the first embodiment of the present invention. As illustrated in FIG. 3, the pre-coding module 27 is configured to include a linear filter generation module 27-1, a perturbation vector search module 27-2, and a transmission signal generation module 27-3. Signal processing by the pre-coding module 27 of the transmit data that is transmitted at a point $t_2$ is described below.

Input into the pre-coding module 27 is $d(k,t_2)=[d_1(k,t_2)$ and so forth up to $d_u(k,t_2)]^T$ that is an output from the mapping module 25, which includes the transmit data that is destined for each of the terminal devices 2-1 to 2-4, which is transmitted on the k-th subcarrier at a point in time $t_2$, and channel matrix $H(k,t_1)$ of the k-th subcarrier that is an output from the channel state information acquisition module 33. For simplicity, descriptions of a subcarrier index k and time indexes $t_1$ and $t_2$ are omitted.

The pre-coding module 27 calculates a linear filter W for initially suppressing IUI in the linear filter generation module 27-1. A method of calculating the linear filter W has no limitation whatsoever. For example, the calculation may be performed based on a ZF norm ($W=H^H(HH^H)^{-1}$) in which the IUI is suppressed completely or an MMSE norm ($W=H^H(HH^H+\alpha 1)^{-1}$) in which a mean squared error for a transmitted signal and a received signal is minimized. At this point, $\alpha$ is a control term for controlling an amount of remaining IUI. Determination is made based on transmission power, or on the number of terminals performing spatial multiplexing and desired reception quality, but for example, a reciprocal of a signal-to-noise power ratio (SNR) per one terminal device may be used for setting. Moreover, the linear filter W may be calculated in such a manner that a total of mean squared errors for multiple subcarriers is set to be minimized. Furthermore, the linear filter W is described above as being set to be calculated in every subcarrier, but the same linear filter may be used in the multiple subcarriers. The linear filter generation module 27-1 outputs the calculated linear filter W to the perturbation vector search module 27-2, the transmission signal generation module 27-3, and the control information generation module 35.

A transmission signal vector s=Wd is calculated by multiplying W that is calculated in the linear filter generation module 27-1 by a transmit data vector d that is expressed by placing pieces of transmit data destined for each of the terminal devices 2-1 to 2-4 side by side. However, in order to set the transmission power to be fixed, $s=\beta Wd$ that results from performing multiplication by a power normalization coefficient $\beta$ for making power of a transmit data vector d and power of a transmission signal vector s before the pre-coding equal to each other is an actual transmission signal vector. The power normalization coefficient $\beta$ is given in Equation (2).

[Math 2]

$$\beta = \sqrt{\frac{P}{tr(WE[dd^H]W^H)}} \quad (2)$$

At this point, P indicates total transmission power. If $\beta=1$, this means that an increase in transmission power needed for performing the pre-coding does not occur, and if $\beta<1$, this means that the needed transmission power increases. If $\beta=1$, this is the case when the linear filter W is an orthogonal matrix.

In order for the linear filter W to be set to be the orthogonal matrix, combination of terminal devices that perform the spatial multiplexing may be appropriately performed, but when control is performed in such a manner, fairness of opportunity for each of the terminal devices 2-1 to 2-4 to perform communication is reduced. For this reason, it is desirable that limitation is not imposed on the combination of the terminal devices. Furthermore, in a case where the number of terminal devices that are connected to the base station device 1 is small, occasionally, the combination of the terminal devices, in which the linear filter W is set to be an orthogonality matrix, is not present. As a method of avoiding the increase in the needed transmission power, a method of adding a perturbation term to transmit data is considered. The pre-coding with the presence of the precondition that the perturbation term is added to the transmit data is referred to as a non-linear pre-coding.

The perturbation term is expressed as a complex number that results from multiplying an arbitrary Gaussian integer by a real number $2\delta$ that is determined in advance. The terminal device performs signal processing that is a modulo operation (or also referred to as a remainder operation) on the received signal, and thus can remove the perturbation term. If the real number $2\delta$ is also referred to as a modulo width and is shared among the base station device 1 and the terminal devices 2-1 to 2-4, any value may be possible, but in a case where a minimum distance between signal points is M value orthogonality amplitude modulation of $\Omega$, it is desirable that $2\delta=\Omega \times M^{1/2}$ is set to be established. For example, in a case of QPSK (4QAM) modulation, $2\delta=2\times 2^{1/2}$ may be established, and in a case of 16QAM modulation, $2\delta=8\times 10^{-1/2}$ may be given. The perturbation vector search module 27-2 can search for a perturbation term that can maximize a power normalization term β, from an indefinite number of perturbation terms, and by adding a result of the search to the transmit data, can ensure fixed reception quality at all times without dependency on the combination of the terminal devices. In a case where frequency efficiency is set to be maximized, the perturbation term that the base station device 1 has to search for is one that minimizes the needed transmission power, a perturbation term that can accomplish desired quality or frequency efficiency may be searched for. Furthermore, the base station device 1 is described above as being set to making a search of a perturbation term in all subcarriers, but the base station device 1 may not make a search of the perturbation term in some of the subcarriers.

According to the present embodiment, because the number of all pieces of transmit data that are space-multiplexed is U, it is possible for the base station device 1 to add the perturbation term to each of all the pieces of transmit data. Furthermore, because the perturbation term is selected from among arbitrary Gaussian integers, even if the number of selectable Gaussian integers is limited to K, all combinations of the perturbation terms that the base station device 1 can add to the transmit data amounts to up to $K^U$. Consequently, it is not realistic to search for all the perturbation terms. Accordingly, the number of selectable Gaussian integers is significantly lowered, the perturbation term that makes needed transmission power at a fixed level or above is excluded from a search candidate (this method is referred to as "sphere encoding"), or so on. Thus, there is a need to limit the number of combinations that have to be considered.

According to the present embodiment, a method of exploring a perturbation term is not limited to anything. For example, the perturbation term may be searched for based on the sphere encoding. The perturbation vector search module 27-2 is described below as being able to search for an optimal perturbation term using a certain method. The perturbation vector search module 27-2 inputs $2\delta z = 2\delta[z_1,$ and so forth up to $z_U]^T$ that is a combination (perturbation vector) of found optimal perturbation terms into the transmission signal generation module 27-3. Moreover, $2\delta z_u$ indicates a perturbation term that is added to transmit data that is destined for the u-th terminal device. At this time, z satisfied Equation (3).

[Math 3]
$$z = \underset{\{z_u \in Z[i], u=1 \sim U\}}{\arg\min} \|W(d + 2\delta z)\|^2 \quad (3)$$

The transmission signal generation module 27-3 calculates a transmission signal vector $s = \beta W(d+2\delta z)$ based on the linear filter W that is calculated in the linear filter generation module 27-1, a perturbation vector z that is calculated in the perturbation vector search module 27-2, and the transmit data vector d. Moreover, the power normalization term β at this time is anew calculated, considering the perturbation vector z. The power normalization term β is described as being included in the linear filter as well.

Moreover, the normalization of the transmitted power is described as being performed in every subcarrier, but power normalization may be performed in such a manner that transmission power of a sum of multiple subcarriers and OFDM signals is set to be fixed. In this case, the search of the perturbation vector z may be controlled, considering needed transmission power of the sum.

A transmission signal vector that is calculated in the transmission signal generation module 27-3 is input, as an output from the pre-coding module 27, into the antenna module 29. Moreover, in a case where the CSI-RS is input into the pre-coding module 27, only adjustment of the transmission power is performed without pre-coding processing being performed, and thus a result of the adjustment is output to the antenna module 29. Furthermore, the pre-coding module 27 outputs the linear filter W calculated in the linear filter generation module 27-1 to the control information generation module 35 as well.

In the control information generation module 35, performed is signal processing for converting the linear filter W being output by the pre-coding module 27 into information that is available for notification to each of the terminal devices 2-1 to 2-4. Because the linear filter W is given by a matrix of $N_t$ rows and (U×L) columns, the linear filter W can be expressed with $W=[w_1, w_2,$ and so forth up to $w_U]^T$. At this point, $w_u$ is a linear filter by which the transmit data that is destined for the u-th terminal device is multiplied, and is indicated by $N_t$ rows and L columns. Information that has to be notified to the u-th terminal device is $w_u$.

In order to notify $w_u$, quantization is performed on $w_u$ in the control information generation module 35. A quantization method has no limitation whatsoever, but for example, a method is considered in which each element of $w_u$ is directly quantized with limited bit length and information after the quantization is notified to the terminal device. Furthermore, information compression technology (a non-compressed feedback scheme, or a compressed feedback scheme) that is employed with wireless LAN standard 802.11n may be applied to $w_u$, and information relating to the notification may be compressed.

Control may be performed in such a manner that the code book in which multiple linear filters are listed is shared in advance between the base station device 1 and each of the terminal devices 2-1 to 2-4, the linear filters listed in the code book is searched for the closest linear filter to $w_u$, and an index card of the closest linear filter is notified. At this time, the code book may vary from one terminal device to another, and control may be performed in such a manner that the linear filter listed in the code book changes with a certain fixed period. Furthermore, in a case where the code book is used in order for the terminal device 2 to notify the base station device 1 of the channel state information, the code book may be used in the notification of the linear filter.

Based on one of the methods described below, the control information generation module 35 quantizes $w_u$ into information that is available for notification to the u-th terminal device, and outputs a quantized signal to a wireless transmission module (a transmission module) 29-3 of the antenna module 29 that is described below. Consequently, in the control information generation module 35, the quantized signal may be converted in advance into a signal suitable for an input into the wireless transmission module 29-3. For example, it is considered that an OFDM signal in which the quantized signal is included is generated and is output to the wireless transmission module 29-3. Furthermore, control may be performed in such a manner that the OFDM signal is transmitted in a state of being combined with different control information.

Figure 4:
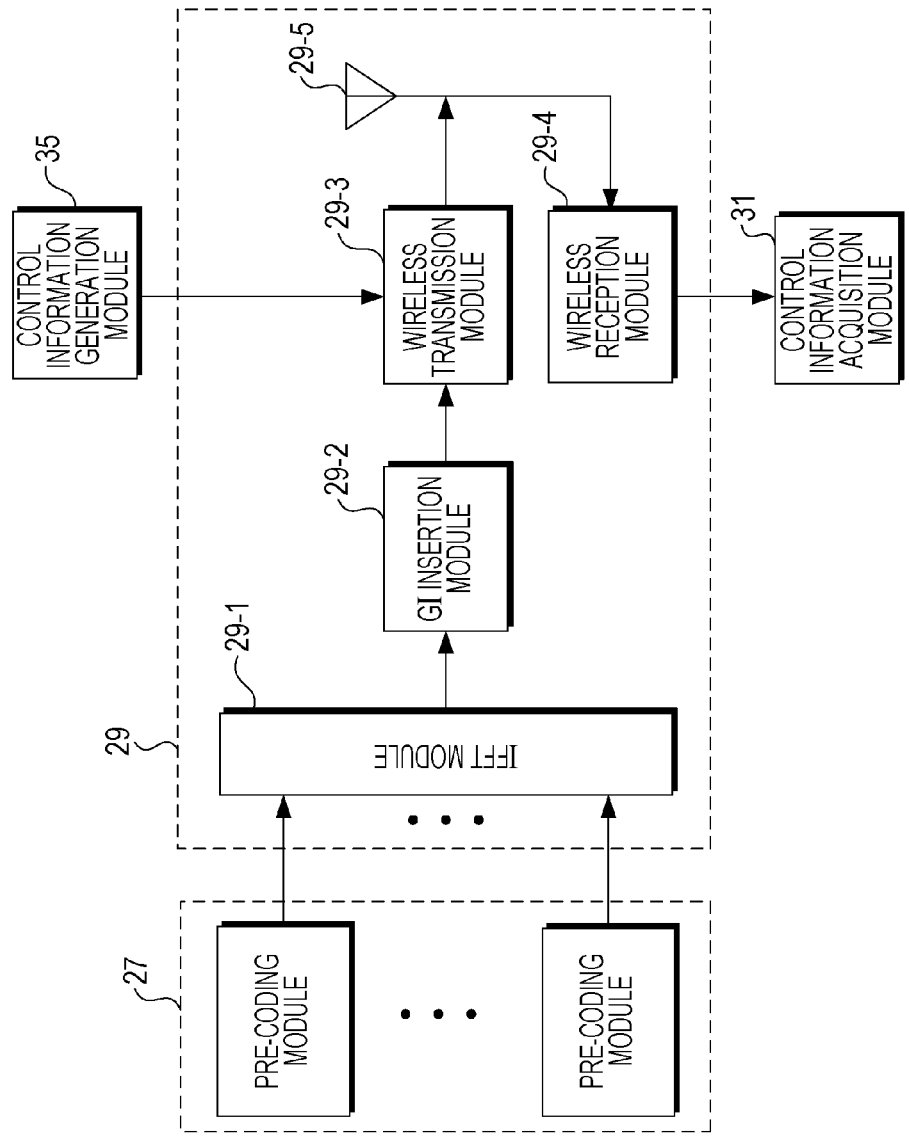
FIG. 4 is a block diagram illustrating a device configuration of an antenna module 29 according to the first embodiment of the present invention.

FIG. 4 is a block diagram illustrating a device configuration of the antenna module 29 according to the first embodiment of the present invention. As illustrated in FIG. 4, the antenna module 29 is configured from an IFFT module 29-1, a GI insertion module 29-2, the wireless transmission module 29-3, a wireless reception module (a reception module) 29-4, and an antenna 29-5. In each antenna module 29, first, the IFFT module 29-1 applies inverse fast Fourier transform (IFFT) of $N_c$ points or inverse discrete Fourier transform (IDFT) to the signal that is output by the corresponding pre-coding module 27, generates an OFDM signal that has $N_c$ subcarriers, and inputs the generated OFDM into the GI insertion module 29-2. At this point, the number of subcarriers and the number of IFFT points are described as being the same, but in a case where a guard band is set to be in a frequency domain, the number of points is greater than the number of subcarriers. The GI insertion module 29-2 assigns a guard interval to the OFDM signal being input and then inputs the resulting OFDM signal into the wireless transmission module 29-3. The wireless transmission module 29-3 converts a transmission signal in a baseband, which is input, into a transmit signal in a radio frequency (RF), and inputs the resulting transmission signal into the antenna 29-5. The antenna 29-5 transmits the transmission signal in the RF, which is input.

[Terminal Device]

Figure 5:
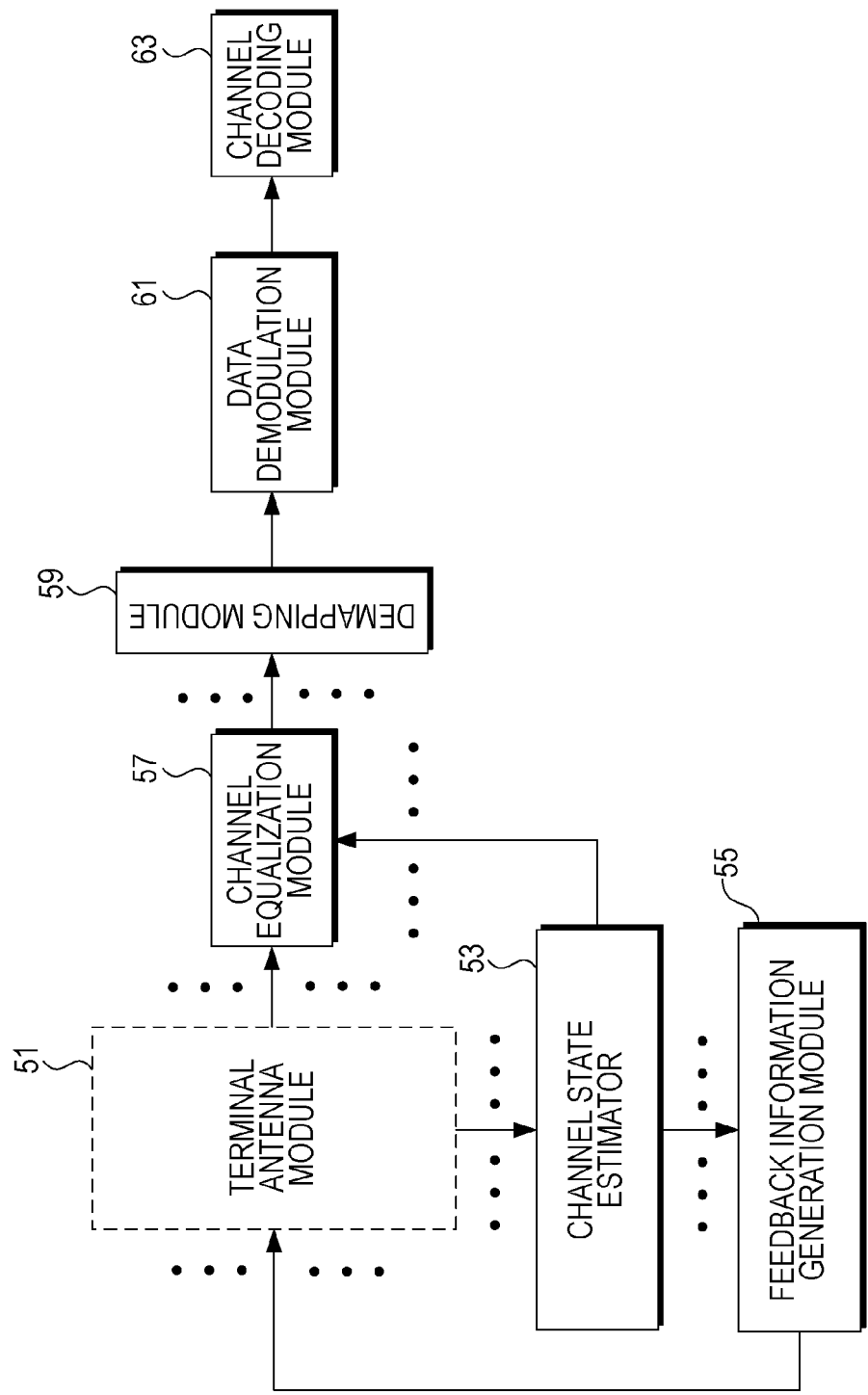
FIG. 5 is a block diagram illustrating a configuration of a terminal device according to the first embodiment of the present invention.

FIG. 5 is a block diagram illustrating a configuration of the terminal device according to the first embodiment of the present invention. As illustrated in FIG. 5, the terminal device is configured to include a terminal antenna module 51, a channel state estimator 53, a feedback information generation module 55, a channel equalization module 57, a demapping module 59, a data demodulation module 61, and a channel decoding module 63. What is more, the number of receive antennas that the terminal antenna module 51 has is only $N_r$. However, the number of receive antennas is described below as being $N_r=1$. Furthermore, at the point in time $t_2$, a signal that is transmitted by the base station device 1 is described as being received.

Figure 6:
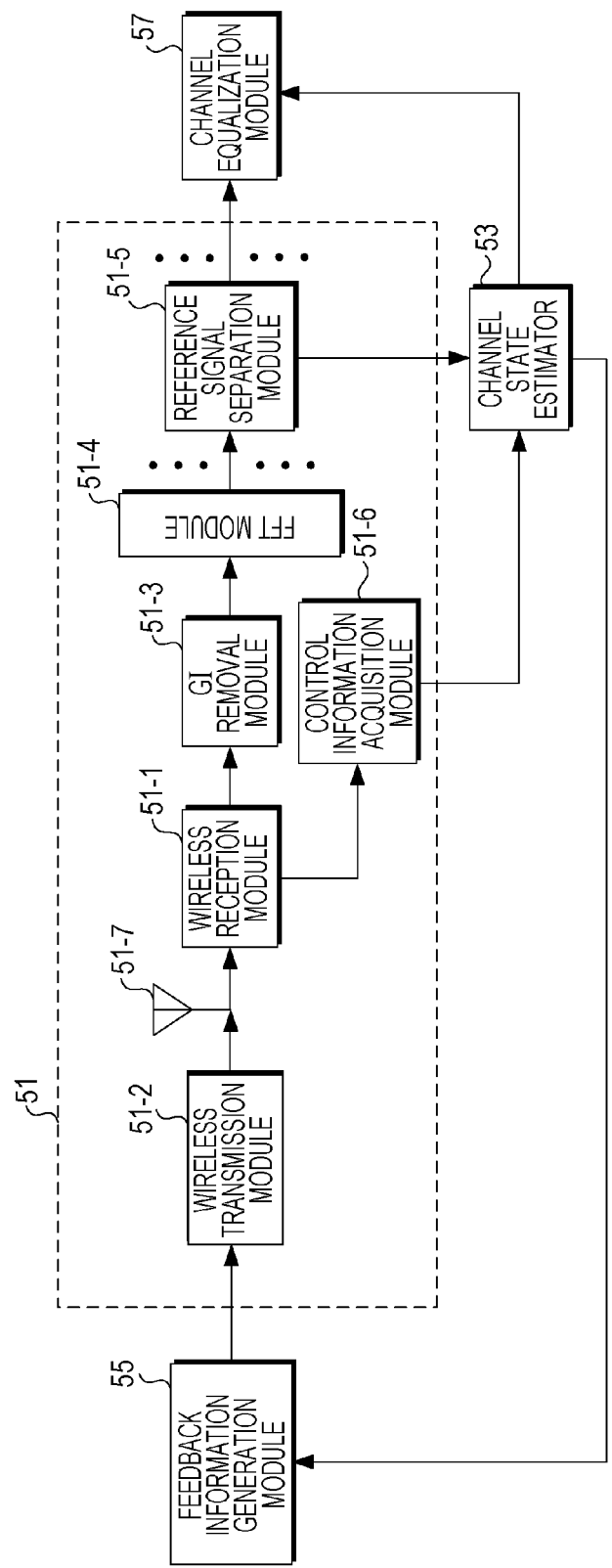
FIG. 6 is a block diagram illustrating a configuration of a terminal antenna module 51 according to the first embodiment of the present invention.

FIG. 6 is a block diagram illustrating a configuration of the terminal antenna module 51 according to the first embodiment of the present invention. As illustrated in FIG. 6, the terminal antenna module 51 is configured to include a wireless reception module 51-1, a wireless transmission module 51-2, a GI removal module 51-3, an FFT module 51-4, a reference signal separation module 51-5, a control information acquisition module 51-6, and an antenna 51-7. A transmission signal that is transmitted by the base station device 1 is first received in the antenna 51-7 of the antenna module 51 of each terminal, and then is input into the wireless reception module 51-1. The wireless reception module 51-1 converts the signal being input into a signal in the baseband, and outputs a data signal and a signal relating to a reference signal (CSI-RS) to the GI removal module 51-3. Furthermore, a signal relating to control information is output to the control information acquisition module 51-6. The GI removal module 51-3 removes a guard interval from the signal being input, and inputs the resulting signal into the FFT module 51-4. The FFT module 51-4 applies $N_c$ point fast Fourier transform (FFT) or discrete Fourier transform (DFT) to the signal being input, converts the resulting signal in $N_c$ subcarrier components, and then inputs a result of the conversion into the reference signal separation module 51-5. The reference signal separation module 51-5 separates the signal being input into a data signal component and a reference signal (CSI-RS) component. The reference signal separation module 51-5 inputs the data signal component into the channel equalization module 57, and inputs the CSI-RS into the channel state estimator 53. Signal processing is described below as being basically performed in every subcarrier.

In the control information acquisition module 51-6, the signal (the signal that is generated in the control information generation module 35 of the base station device 1) associated with the linear filter that is generated in the pre-coding module 27 of the base station device 1 is acquired from the signal that is input from the wireless reception module 51-1, and the linear filter ($w_u$ in a case of the u-th terminal device) by which the transmit data that is destined for the terminal device to which the control information acquisition module 51-6 belongs is calculated. The u-th terminal device is described below as ideally being able to acquire $w_u$. The control information acquisition module 51-6 outputs calculated $w_u$ to the channel state estimator 53.

The channel state estimator 53 performs the channel estimation based on the CSI-RS that is a known reference signal being input. Because the CSI-RS is transmitted without the pre-coding being applied to it, from channel matrix $H(k,t_2)$ that is expressed in Equation (1), it is possible to estimate matrix $h_u(k,t_2)$ that corresponds to each terminal device. Normally, because the CSI-RS's are intermittently multiplexed onto the radio resources, the channel state information on all subcarriers is difficult to directly estimate, but the estimation of the channel state information on all the subcarriers by suitable interpolation is possible by transmitting the CSI-RS in a time interval such as one in compliance with a sampling theorem, and in a frequency interval. A specific channel estimation method is not particularly limited, but for example, two-dimensional MMSE channel estimation may be used.

The channel state estimator 53 inputs the channel state information that is estimated based on the CSI-RS into the feedback information generation module 55. The feedback information generation module 55 generates information that is fed back to the base station device 1, according to the channel state information being input and a channel state information format that is fed back by each of the terminal devices 2-1 to 2-4. According to the present invention, the channel state information format has no limitation whatsoever. For example, a method may be considered in which the quantization using a limited number of bits is not performed in the channel state information that is estimated by the terminal device in every subcarrier, or in every resource block into which multiple subcarriers are arranged, and quantization information on the channel state information is fed back. Furthermore, the feedback may be performed based on the code book that is determined in advance by the terminal device and the base station device 1.

Furthermore, the feedback information generation module 55 may perform certain signal conversion and then perform the quantization without directly quantizing the channel state information. For signal conversion, for example, a method of performing the single value decomposition may be considered. In this case, the feedback information generation module 55 quantizes an eigenvector obtained by the single value decomposition, or both the eigenvector and a singular value, and thus generates information that is notified to the base station device 1.

Moreover, according to the present embodiment, all pieces of channel state information are set to use the channel state information in every subcarrier, that is, on the frequency domain. On the other hand, the feedback information generation module 55 may perform inverse discrete Fourier transform or inverse discrete Fourier transform on the channel state information that is estimated in the frequency domain, thus may convert the resulting channel state information into channel state information on a time domain, and then may perform the quantization. Furthermore, the feedback information generation module 55 may perform control in such a manner that only one portion of the channel state information that is converted into the time domain is fed back.

Furthermore, based on the multiple pieces of channel state information that are acquired until the point in time $t_1$, and based on channel state information that is obtained by performing extrapolation, the feedback information generation module 55 may generate feedback information.

Furthermore, in a case where extrapolation is performed based on extrapolation based on polynomial interpolation such as first-order linear prediction, a coefficient of a polynomial that is used in the interpolation may be set to be feedback information. For example, in a case where the terminal device 2 performs first-order linear prediction of channel state information H(t) at a point in time t, the terminal device 2 performs the prediction based on a linear equation that is expressed as H(t)=A×t+B. At this point, based on a least squares method, a mean square error minimizing method, or the like, A and B are calculated for every complex channel gain of each antenna and each discrete path. In this case, the feedback information generation module 55 may set A and B, which are calculated for every complex channel gain of each antenna and each discrete path, to be feedback information.

Furthermore, the prediction of the channel state information may be performed in the frequency domain. In this case, the terminal device 2 may perform linear prediction in every subcarrier and may perform the linear prediction for every resource block into which multiple subcarriers are arranged. In this case, the terminal device 2 also may set a coefficient of a polynomial that is used in the prediction, not the predicted channel state information itself, to be feedback information.

As described above, there are various pieces of information that it is possible for the terminal device 2 to notify as feedback information, but if a feedback information format is shared between the base station device 1 and the terminal device 2, it is possible for the base station device 1 to acquire channel information based on the information that is fed back.

The feedback information generation module 55 inputs the generated signal into the wireless transmission module 51-2 of the antenna module 51 of each terminal. The wireless transmission module 51-2 converts the signal being input into a signal suitable for the notification to the base station device 1 and inputs the signal into the antenna 51-7 of the antenna module 51 of the terminal. The antenna 51-7 transmits the signal being input to the base station device 1.

Next, signal processing in the channel equalization module 57 is described. Now, when a data signal component of the k-th subcarrier that is received in the u-th terminal device at the point in time $t_2$ is set to be indicated by $r_u(t_2)$ (the subcarrier index k is omitted), $r_u(t_2)$ is given in Equation (4).

[Math 4]

$$r_u(t_2) = h_u(t_2)W(d + 2\delta z) + \eta_u(t_2) \quad (4)$$
$$= h_u(t_2)w_u(d_u + 2\delta z_u) + h_u(t_2)\sum_{i=1, i\neq u}^{U} w_i(d_i + 2\delta z_i) + \eta_u(t_2)$$

At this point, channel time and frequency selectivity have an influence on a desired signal $(d_u + 2\delta z_u)$ and thus signal amplitude and phase change. For this reason, in order to correctly demodulate the desired signal, channel equalization processing that removes this influence is needed. In order to perform the channel equalization processing, a channel gain that has an influence on the signal amplitude and phase needs to be estimated.

At this point, a channel gain $h_u(t_2)$ is already acquired in the channel state estimator 53. However, because the base station device 1 performs the pre-coding, $h_u(t_2) \times w_u$ has an influence on the desired signal.

Accordingly, in a method in the related art, the base station device transmits a demodulation reference signal (DMRS) as a reference signal in a state of being added to the CSI-RS. Like the data signal, the DMRS is multiplied by the linear filter W and is transmitted, and moreover, the DMRS is transmitted with radio resources that are orthogonal or pseudo-orthogonal to each other between the terminal devices. For this reason, it is possible for each terminal device to estimate $h_u(t_2) \times w_u$ needed for channel equalization.

At this point, in Equation (4), a first term is a desired signal component, and a second term indicates a remaining IUI component and a third term indicates a noise component. If Equation (4) is divided by $h_u(t_2) \times w_u$ that is estimated with DMRS, it is understood that influences of changes in phase and amplitude on the desired signal can be compensated for. Furthermore, the desired signal is configured from a desired data signal $d_u$ and a perturbation term $z_u$ that is added to the desired data signal, but it is possible to remove this perturbation term by the modulo operation described below. However, a perturbation term that is added to transmit data that is destined for a different terminal device, which is included in the remaining IUI, is difficult to remove by the modulo operation. Consequently, if the channel equalization is performed based on a channel estimate that is obtained by the DMRS, channel performance degrades greatly.

Accordingly, according to the present embodiment, it is considered that the terminal device not only performs demodulation based on the DMRS, but also performs signal modulation based on a linear filter $w_u$ that is notified from the base station device 1.

As already described, the channel state estimator 53 can estimate $h_u(t_2)$ that is channel state information on which the pre-coding is not performed, with the CSI-RS. Consequently, if estimated $h_u(t_2)$ is multiplied by $w_u$ that is notified by the base station device 1, the channel state estimator 53 can estimate channel state information $h_u(t_2) \times w_u$ that is the same as a value estimated with the DMRS. However, when the signal demodulation is performed based on this information, a large amount of remaining IUI occurs.

Incidentally, as already described, the pre-coding that is performed on the signal that is now received is not performed based on the channel state information that is notified at the point in time $t_1$ by the terminal device. Consequently, the terminal device is aware of the channel state information at the point in time $t_1$ as well. Accordingly, in the channel state estimator 53 according to the present embodiment, $h_u(t_1)w_u$ that results from multiplying $h_u(t_1)$ estimated based on the CSI-RS received at the point in time $t_1$ by $w_u$ notified by the base station device 1 is output, as the channel estimate, to the channel equalization module 57.

In the channel equalization module 57, the channel equalization is performed on the received signal based on $h_u(t_1)w_u$ that is input by the channel state estimator 53. At this time, it is considered that an error for the channel state information at the point in time $t_1$ and the channel state information at the point in time $t_2$ is indicated by an error vector $e_u$ (that is, $h_u(t_2)=h_u(t_1)+e_u$). At this time, Equation (4) can be expressed like Equation (5)(a noise term is omitted).

[Math 5]

$$\begin{aligned} r_u(t) &= h_u(t_2)W(d+2\delta z) \\ &= (h_u(t_1)+e_u)W(d+2\delta z) \\ &= h_u(t_1)w_u(d_u+2\delta z_u) + h_u(t_1)\sum_{i=1,i\neq u}^{U} w_i(d_i+2\delta z_i) + \\ &\quad e_u \sum_{i=1}^{U} w_i(d_i+2\delta z_i) \end{aligned} \quad (5)$$

At this point, a first term is a desired signal component, a second term is a remaining IUI that occurs at the time of the pre-coding, and a third term is a remaining IUI that occurs due to a channel change. In the channel equalization module 57, the channel equalization is performed that divides Equation (5) by $h_u(t_1)w_u$. Moreover, the channel equalization is not limited to this method. A signal after the channel equalization is given in Equation (6).

[Math 6]

$$\begin{aligned} \hat{d}_u &= r_u(t)/h_u(t_1)w_u \\ &= (d_u+2\delta z_u) + \frac{h_u(t_1)}{h_u(t_1)w_u}\sum_{i=1,i\neq u}^{U} w_i(d_i+2\delta z_i) + \\ &\quad \frac{e_u}{h_u(t_1)w_u}\sum_{i=1}^{U} w_i(d_i+2\delta z_i) \end{aligned} \quad (6)$$

At this point, focus is on a third term. Instantaneous power that is the third term is given in Equation (7).

[Math 7]

$$\left\| \frac{e_u}{h_u(t_1)w_u} \sum_{i=1}^{U} w_i(d_i+2\delta z_i) \right\|^2 = \frac{1}{|h_u(t_1)w_u|^2} \|e_u W(d+2\delta z)\|^2 \quad (7)$$

At this point, as understood from Equation (3), an object of the non-linear pre-coding that is performed in a pre-coding device of the base station device 1 is to minimize $\|W(d+2\delta z)\|^2$. Consequently, by performing the channel equalization based not on $h_u(t_2)w_u$, but on $h_u(t_1)w_u$, it is possible to minimize an influence of the remaining IUI resulting from the channel change.

Moreover, with the method that is described above, an influence of phase rotation due to differences in frequency between an oscillator of the base station device 1 and oscillators of the terminal devices 2-1 to 2-4 is also included in an error vector, and in this state, signal demodulation is performed. If the phase rotation can be estimated with another method, control may be performed in such a manner that the equalization which takes into account an influence of the phase rotation at the time of the channel equalization is performed.

Furthermore, the terminal devices 2-1 to 2-4 are described above as being able to be aware that the base station device 1 performs the pre-coding on the transmit data that is transmitted at the point in time $t_2$ based on the CSI notified at the point in time $t_1$, but a case is also considered where the terminal devices 2-1 to 2-4 are not aware of which point in time the CSI on which the precoding performed by the base station device 1 is based is notified at. Consequently, in the pre-coding module 27 of the base station device 1, information associated with the linear filter that is used in the pre-coding is output to the control information generation module 35, but however, a configuration may be possible in which control information with which it is possible to be aware of which point in time the CSI that is used in the pre-coding is notified at by the terminal devices 2-1 to 2-4 is output to the control information generation module 35. For example, if the pre-coding on the transmit data that is transmitted at the time t is performed for a wireless communication system that invariably uses the CSI notified at a point (t−τ), the base station device 1 may notify the terminal devices 2-1 to 2-4 of a value of τ.

Moreover, in a case of a communication system in which the CSI that is used in the pre-coding is determined in advance, to be more precise, in a case where the value of τ is determined in advance, this configuration may not be employed. Furthermore, control may be performed in such a manner that the terminal devices 2-1 to 2-4 estimate τ.

Furthermore, in the method described above, the base station device 1 notifies the terminal devices 2-1 to 2-4 of the linear filter $w_u$, and the terminal devices 2-1 to 2-4 estimate the channel estimate that is used by the channel equalization module 57 by multiplying the CSI estimated in each of the terminal devices 2-1 to 2-4 themselves by $w_u$, but a configuration may be employed in which the base station device 1 directly notifies the terminal devices 2-1 to 2-4 of $h_u(t_1)w_u$, not the linear filter $W_u$. At this time, a configuration may be employed in which the terminal devices 2-1 to 2-4 further perform signal processing on $h_u(t_1)w_u$ that is notified by the base station device 1. This is because in some cases, information relating to a long period change in channel such as a propagation loss between the base station device 1 and each of the terminal devices 2-1 to 2-4 is not included in the CSI that can be notified by the terminal devices 2-1 to 2-4.

In the channel equalization module 57, the modulo operation for removing the perturbation term from a received signal $\hat{d}_u$ after the channel equalization is furthermore performed. At this point, the modulo operation is signal processing that is given in Equation (8).

[Math 8]

$$\text{modulo}_{2\delta}(\hat{d}_u) = \hat{d}_u - 2\delta \cdot \text{floor}(\hat{d}_u/2\delta + (1+\hat{j}/2)) \quad (8)$$

For an input, the modulo operation makes sizes of real and imaginary parts of an output greater than −δ and smaller than δ. Consequently, in a case where power of the remaining IUI and power of the noise are sufficiently small, the modulo operation can remove a perturbation term, of which real and imaginary parts are equal to or greater than 2δ in size. In the channel equalization module 57, a signal after the channel equalization and the modulo operation is output to the demapping module 59.

With the demapping module 59, the terminal devices 2-1 to 2-4 extract transmit data that is destined for the terminal devices 2-1 to 2-4 themselves, respectively, from radio resources that are used in transmission of the transmit data that is destined for the terminal devices 2-1 to 2-4 themselves. Moreover, a configuration may be employed in which an output from the reference signal separation module 51-5 is first input into the demapping module 59, and only components of radio resources that correspond to the terminal device to which the reference signal separation module 51-5 belongs are input into the channel equalization module 57. Thereafter, an output from the demapping module 59 is input into the data demodulation module 61 and the channel decoding module 63, and data demodulation and channel decoding are performed.

Moreover, with a method of performing the channel decoding that is performed in the channel decoding module 63, it is also possible to directly perform decoding using a signal to which a perturbation term is added. In this case, the channel equalization module 57 may perform the modulo operation.

According to the present embodiment, OFDM signal transfer is assumed, and the pre-coding is assumed to be performed in every subcarrier, but units to which a transfer scheme is applied is not limited (or an access scheme) or of pre-coding. For example, it is also possible to apply the present embodiment to a case where the pre-coding is performed in every resource block into which multiple subcarriers are arranged, and in the same manner, it is also possible to apply the present embodiment to a single carrier-based access scheme (for example, single-carrier frequency division multiple access (SC-FDMA) scheme and the like).

With the method described above, in downlink MU-MIMO transfer that is based on the non-linear pre-coding, it is possible to suppress the remaining IUI that occurs due to a change in channel over time. Consequently, in an environment where it is difficult for the change in channel over time to be negligible, it is also possible to perform transfer without causing transmission performance to degrade greatly.

Second Embodiment

An object of the first embodiment is to suppress the remaining IUI that occurs due to a time change error among elements that make up a feedback error. However, in addition to the time change error, a quantization error is also included in the feedback error. According to a second embodiment, focus is on a transfer scheme in which consideration is also given to the remaining IUI that occurs due to the quantization error. What mainly distinguishes the second embodiment from the first embodiment is signal processing in each of a channel state estimator 73, a feedback information generation module 75 and a channel equalization module 57 of each of the terminal devices 2-1 to 2-4 in FIG. 7, and signal processing in the channel state information acquisition module 33 of the base station device 1.

[Method in which the Terminal Device Feeds Back the CSI]

Figure 7:
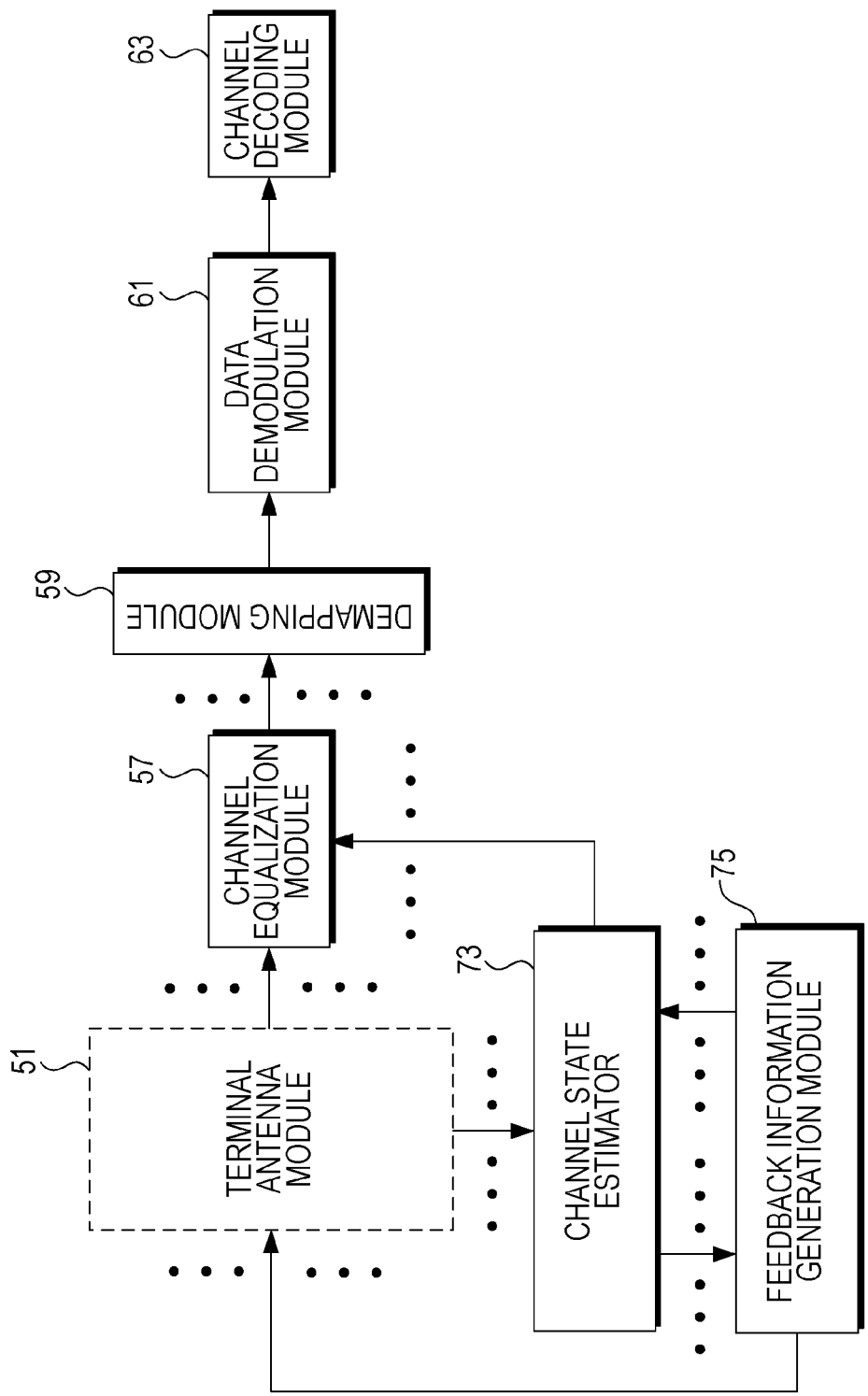
FIG. 7 is a block diagram illustrating a device configuration of a terminal device according to a second embodiment of the present invention.

FIG. 7 is a block diagram illustrating a device configuration of a terminal device according to the second embodiment of the present invention. A device configuration is almost the same as that in FIG. 5, but the feedback information generation module 75 has an output to the terminal antenna module 51 and additionally has an output to the channel state estimator 73 as well. Moreover, a configuration of the terminal antenna module 51 is the same as that in FIG. 6. Among types of signal processing that are performed by the terminal device, signal processing relating to the feedback of the CSI is described.

First, it is considered that a CSI-RS which is transmitted at the point in time $t_1$ is input to the channel state estimator 73 of each of the terminal devices 2-1 to 2-4. In the channel state estimator 73, the channel estimation is performed based on the signal being input. Generally, because the CSI-RS is not transmitted in all subcarriers, the subcarrier in which the CSI is difficult to directly estimate is present, but the CSI in all the subcarriers is described below as being estimated by suitable interpolation. The channel state estimator 73 outputs estimated $h_u(t_1)$ to the feedback information generation module 75.

In the feedback information generation module 75, $h_u(t_1)$ being input is quantized into information that is available for the notification to the base station device 1. Incidentally, an amount of information needed for notifying the base station device 1 from the terminal devices 2-1 to 2-4 of the channel state information is made as small as possible. In order to reduce the amount of information relating to the feedback, a method is considered in which the terminal devices 2-1 to 2-4 notify the base station device 1 of only the CSI in some of the subcarriers. In this case, the base station device 1 estimates the CSI in other subcarriers using a certain estimation method, based on the CSI in some of the subcarriers that is notified from each of the terminal devices 2-1 to 2-4. The estimation method is hereinafter referred to as a base station CSI estimation method. At this point, the CSI on the u-th terminal device that is estimated by the base station device 1 based on the base station CSI estimation method is set to be expressed by $h_{u, FB}$. An error for $h_u(t_1)$ and $h_{u, FB}$ that are estimated by each of the terminal devices 2-1 to 2-4 is a quantization error.

In this case, if the base station CSI estimation method can be shared between the base station device 1 and each of the terminal devices 2-1 to 2-4, the terminal devices 2-1 to 2-4 can be aware of $h_{u, FB}$. Accordingly, the terminal devices 2-1 to 2-4 according to the present embodiment notify the base station device 1 of control information that designates the base station CSI estimation method in addition to the channel state information that is finally notified to the base station device 1.

The control information that designates the base station CSI estimation method has no limitation whatsoever. For example, notifying information which designates an interpolation method may be considered. The base station device 1 can estimate the CSI in other subcarriers by performing certain interpolation based on the CSI in some of the subcarriers that is notified from each of the terminal devices 2-1 to 2-4. Accordingly, if the terminal devices 2-1 to 2-4 notify the base station device 1 of the interpolation method and the base station device 1 estimates the CSI based on the interpolation method being notified, the terminal devices 2-1 to 2-4 can be aware of $h_{u, FB}$ in all the subcarriers.

In this case, in order to estimate the CSI in other subcarriers from the CSI in some of the subcarriers that is notified to the base station device 1, control may be performed in such a manner that the terminal devices 2-1 to 2-4 calculate the most suitable interpolation method and notify the base station device 1 of the most suitable interpolation method. As the interpolation method, polynomial interpolation including 0-th interpolation, 1-th interpolation, and the like, sinc function interpolation and the like may variously be considered. Consequently, control may be performed in such a manner that the terminal devices 2-1 to 2-4 are aware in advance of the interpolation methods that are executable by the base station device 1, and notify the base station device 1 of the most suitable of the interpolation methods.

Furthermore, a case is also considered where when $h_u(t_1)$ is quantized, a certain technology of compressing an amount of information being used. Information that designates the technology of compressing the amount of information is also included in control information that designates the base station CSI estimation method.

Moreover, in a case of the communication system in which the base station CSI estimation method is determined in advance, the terminal devices 2-1 to 2-4 may not notify control information for designating the base station CSI estimation method.

As described above, the configuration is employed in which the terminal devices 2-1 to 2-4 designate the base station CSI estimation method. Unlike in this case, the base station device 1 may determine the base station CSI estimation method. In such a case, the base station device 1 notifies the terminal devices 2-1 to 2-4 of the control information with which it is possible to be aware of which base station CSI estimation method is used.

The feedback information generation module 75 of each of the terminal devices 2-1 to 2-4, as described above, combines control information associated with the CSI that is notified to the base station device 1 and control information for designating the base station CSI estimation method, and outputs a result of the combination to the wireless transmission module 51-2 of the terminal antenna module 51. Furthermore, the feedback information generation module 75 calculates $h_{u, FB}$, and outputs a result of the calculation to the channel state estimator 73.

The wireless transmission module 51-2 converts the control information being input into a signal that is available for transmission to the base station device 1, and then outputs the resulting signal to the antenna 51-7.

[Base Station Device]

A configuration of the base station device 1 according to the second embodiment is the same as those in FIGS. 2 and 3, and what distinguishes the second embodiment from the first embodiment is signal processing that is performed in the channel state information acquisition module 33. Accordingly, the signal processing in the channel state information acquisition module 33 is described below.

In the channel state information acquisition module 33, channel state information $h_{u, FB}$ in all the subcarriers is calculated based on control information associated with the channel state information on a channel between the base station 1 and each of the terminal devices 2-1 to 2-4, which is input by the control information acquisition module 31. At this time, based on the base station CSI estimation method that is designated by the control information that designates the base station CSI estimation method that is notified by each of the terminal devices 2-1 to 2-4, the base station device 1 calculates the channel state information $h_{u, FB}$ in all the subcarriers from the control information associated with the channel state information on the channel between the base station device 1 and each of the terminal devices 2-1 to 2-4, and outputs a result of the calculation to the pre-coding module 27.

In the pre-coding module 27, based on the channel state information $h_{u, FB}$, which is input, the pre-coding is performed. Signal processing in other constituent devices that belong to the base station device 1 is the same as that according to the first embodiment, and thus a description thereof is omitted.

[Signal Processing in the Channel Equalization Module 57 of the Terminal Device]

Signal processing by each of the terminal devices 2-1 to 2-4 on the signal received at the point in time $t_2$ is described below. What distinguishes the signal processing from that according to the first embodiment is signal processing in the channel state estimator 73.

In the channel state estimator 73, according to the first embodiment, $h_u(t_1)w_u$ that results from multiplying channel state information $h_u(t_1)$ estimated at the point in time $t_1$ by $w_u$ that is notified from the base station device 1 is output, as information that is used in the channel equalization, to the channel equalization module 57. According to the second embodiment, $h_{u, FB}w_u$ that results from multiplying $h_{u, FB}$ that is input by the feedback information generation module 75, by $w_u$ that is notified from the base station device 1, not the channel state information $h_u(t_1)$ estimated at the point in time $t_1$, is output, as information that is used in the channel equalization, to the channel equalization module 57.

In the channel equalization module 57, the channel equalization is performed based on $h_{u, FB}w_u$ that is input by the channel state estimator 73. At this point, it is considered that an error for the channel state information at the point in time $t_2$ and for $h_{u, FB}$ is indicated by an error vector $e_{u, FB}$ (that is $h_u(t_2)=h_{u, FB}+e_{u, FB}$). At this time, the received signal is given in Equation (9).

[Math 9]

$$r_u(t) = h_u(t_2)W(d + 2\delta z) \qquad (9)$$
$$= (h_{u,FB} + e_{u,FB})W(d + 2\delta z)$$
$$= h_{u,FB}w_u(d_u + 2\delta z_u) + h_{u,FB}\sum_{i=1, i \neq u}^{U} w_i(d_i + 2\delta z_i) +$$
$$e_{u,FB}\sum_{i=1}^{U} w_i(d_i + 2\delta z_i)$$

By performing the channel equalization that divides Equation (9) by $h_{u, FB}w_u$, in the same manner as in the first embodiment, it is possible for the channel equalization module 57 to suppress the remaining IUI that occurs due to the feedback error.

Furthermore, because an error for the channel state information at the point in time $t_1$ and the channel state information at the point in time $t_2$ is also included in the error vector $e_{u, FB}$, with the method according to the present embodiment, it is also possible to suppress the remaining IUI that occurs due to the change in channel over time.

Moreover, signal processing in other constituent devices is the same as that according to the first embodiment, and thus a description thereof is omitted.

Furthermore, in a case where the quantization error is 0, that is, when $h_u(t_1)=h_{u, FB}$, the signal processing according to the second embodiment is all the same as that according to the first embodiment. Consequently, according to an amount of quantization error, control may be performed in such a manner that use occurs with switching between the method according to the first embodiment and the method according to the second embodiment.

According to the second embodiment, in an environment where it is difficult for the quantization error that occurs due to CSI quantization to be negligible, focus is on the MU-MIMO transfer that is based on the non-linear pre-coding. According to the second embodiment, channel performance is realized which is excellent in that the remaining IUI that occurs due to the quantization error can be suppressed.

Third Embodiment

According to the first and second embodiments, focus is on a wireless communication system in which the FDD that uses different carrier frequencies in uplink transfer and downlink transfer is used as a duplex scheme. According to the third embodiment, focus is on a wireless communication system in which Time Division Duplex (TDD) that uses the same carrier frequencies in the uplink transfer and the downlink transfer is used as the duplex scheme.

Figure 8:
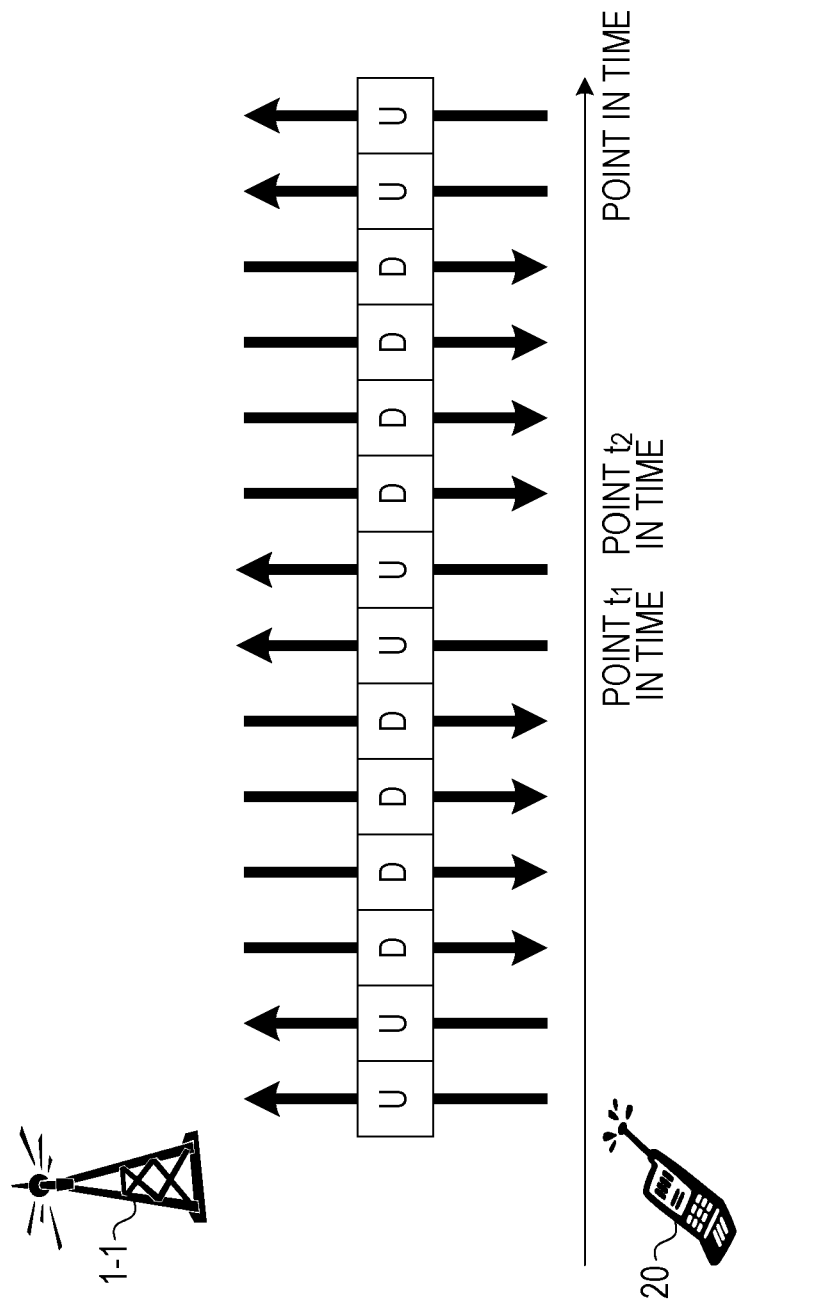
FIG. 8 is a diagram illustrating one example of a frame format according to a third embodiment.

FIG. 8 is a diagram illustrating one example of a frame format according to the third embodiment. As illustrated in FIG. 8, in a system that is based on the TDD, an uplink signal ("U" in FIG. 8) and a downlink signal ("D" in FIG. 8) are alternately transmitted. Distribution for allocation of radio resources for the uplink and the downlink may be equal distribution and may be biased. For description, it is considered that U terminal devices are connected to the base station device at the same time. Radio resources that are allocated are described below as being set to be the same in the uplink and downlink. Then, focus is on a case where the MU-MIMO transfer is performed in uplink transfer and downlink transfer. However, a case where different radio resources are allocated to the uplink transfer and the downlink transfer, and a case where the MU-MIMO transfer is not performed in the uplink transfer are included in the present embodiment.

Furthermore, a description is provided with focus on the downlink transfer in which the MU-MIMO transfer that is based on the non-linear pre-coding is performed. According to the present embodiment, a transfer scheme in the uplink transfer has no limitation whatsoevery. For example, the OFDM signal transfer that is a target in the downlink transfer according to the first and second embodiments may be possible, and an access scheme of a single carrier system such as the SC-FDMA may be used. Furthermore, the MU-MIMO transfer is not necessarily performed in the uplink transfer. However, a reference signal that is included in signals for the uplink transfer from the terminal devices 2-1 to 2-4 are set to be orthogonal, or pseudo-orthogonal to one another. To be more precise, the base station device is set to be able to estimate the CSI between the base station and each of the terminal devices 2-1 to 2-4 that are connected at the same time, from the reference signal that is included in the uplink signal.

The base station device estimates the CSI from the reference signal that is included in the uplink signal that is transmitted from each of the terminal devices 2-1 to 2-4 at the point in time $t_1$. Based on the estimated CSI, the base station device performs the non-linear pre-coding on the downlink signal that is transmitted to each of the terminal devices 2-1 to 2-4 at the point in time $t_2$.

[Base Station Device]

Figure 9:
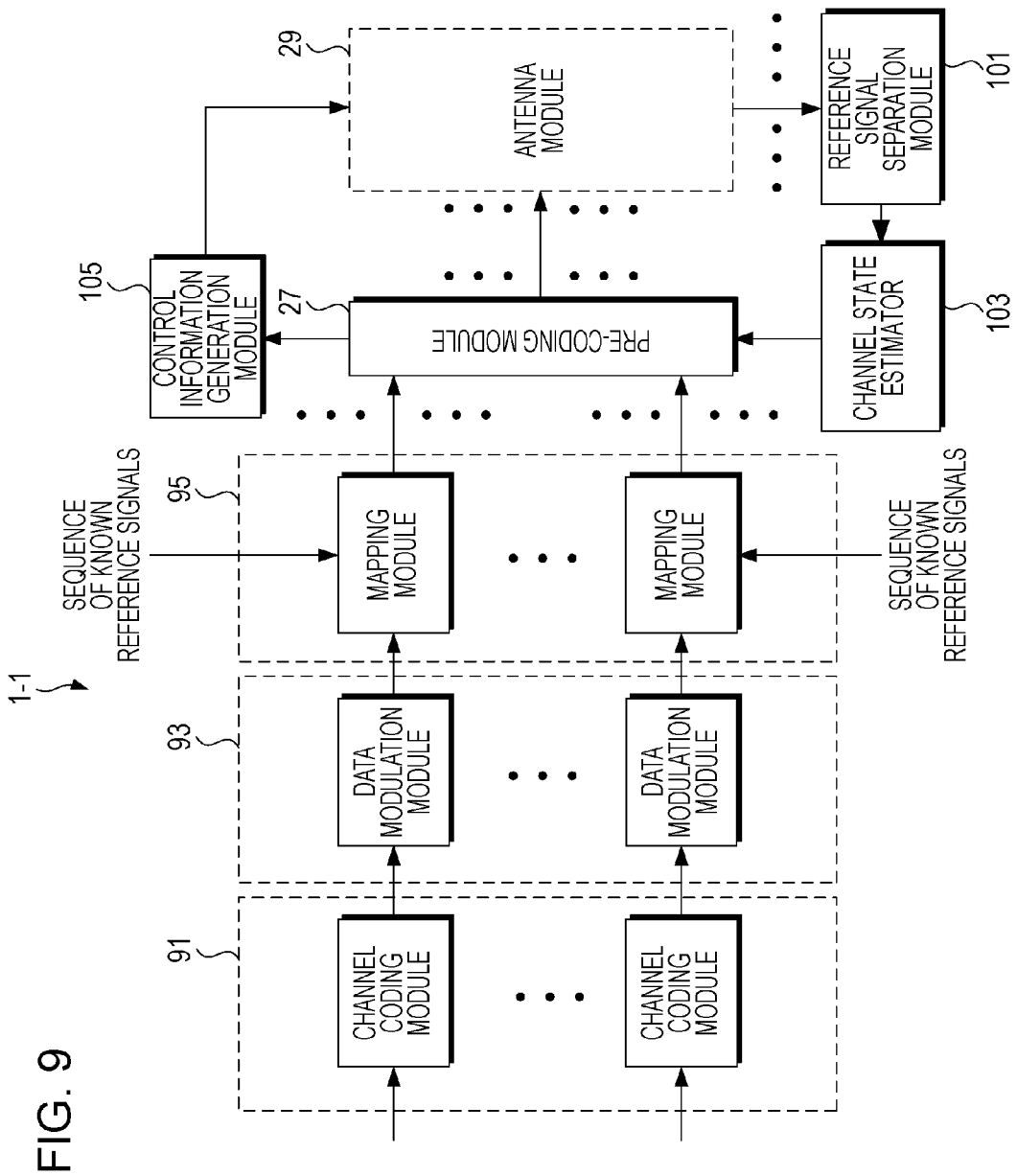
FIG. 9 is a block diagram illustrating a configuration of a base station device 1-1 according to the third embodiment of the present invention.

FIG. 9 is a block diagram illustrating a configuration of a base station device 1-1 according to the third embodiment of the present invention. However, only constituent devices relating to the downlink signal transfer are illustrated. As illustrated in FIG. 9, the base station device 1-1 is configured to include a channel coding module 91, a data modulation module 93, a mapping module 95, the pre-coding module 27, the antenna module 29, a reference signal separation module 101, a channel state estimator (estimator) 103, and a control information generation module 105. As many pre-coding modules 27 as the number $N_c$ of subcarriers are present and as many antenna modules 29 as the number $N_t$ of transmit antennas are present. A configuration of the antenna module 29 is the same as that in FIG. 4. However, an output from a wireless reception module 29-4 is input into the reference signal separation module 101, not the control information acquisition module 31.

First, at the point in time $t_1$, an antenna of the antenna module 29 receives a signal that is transmitted by each of the terminal devices 2-1 to 2-4, and inputs the received signal into the wireless reception module 29-4. In the wireless reception module 29-4, the signal being input is converted into a signal in a baseband and then is output to the reference signal separation module 101. At this point, for brief description, an output from the wireless reception module 29-4 is input directly into the reference signal separation module 101, but a data signal or a different control signal, as well as a reference signal, is included in an actual uplink signal. In such a case, as in the terminal antenna module 51 that is illustrated in FIG. 6, an output from the wireless reception module 29-4 goes through processing by the GI removal module 51-3, the FFT module 51-4, or the like, and then is input into the reference signal separation module 101. Before the output is input into the reference signal separation module 101, signal processing that is performed on the received signal is determined depending on a transfer scheme for the uplink transfer.

In the reference signal separation module 101, the reference signal for estimating the CSI between the base station device 1-1 and each terminal device at the point in time $t_1$ is separated from the signal being input, and the resulting reference signal is output to the channel state estimator 103. In the channel state estimator 103, based on the reference signal being input, the CSI between the base station device 1-1 and each terminal device at the point in time $t_1$ is estimated and the estimated CSI is output to the pre-coding module 27. A configuration of the pre-coding module 27 is the same as that in FIG. 3. However, the reason for this output to the control information generation module 105 is that information indicating at which point in time the uplink signal on which the CSI being input into the pre-coding module 27 is based in addition to the linear filter $w_u$ generated in the linear filter generation module 27-1 is transmitted, and the like are also included. Moreover, the point in time that is notified may be notified individually for every terminal device, and control may be performed in such a manner that an average value is notified.

Signal processing by each constituent device of a different base station in the downlink signal transfer is the same as that according to the first embodiment, and a description thereof is omitted.

[Terminal Device]

Figure 10:
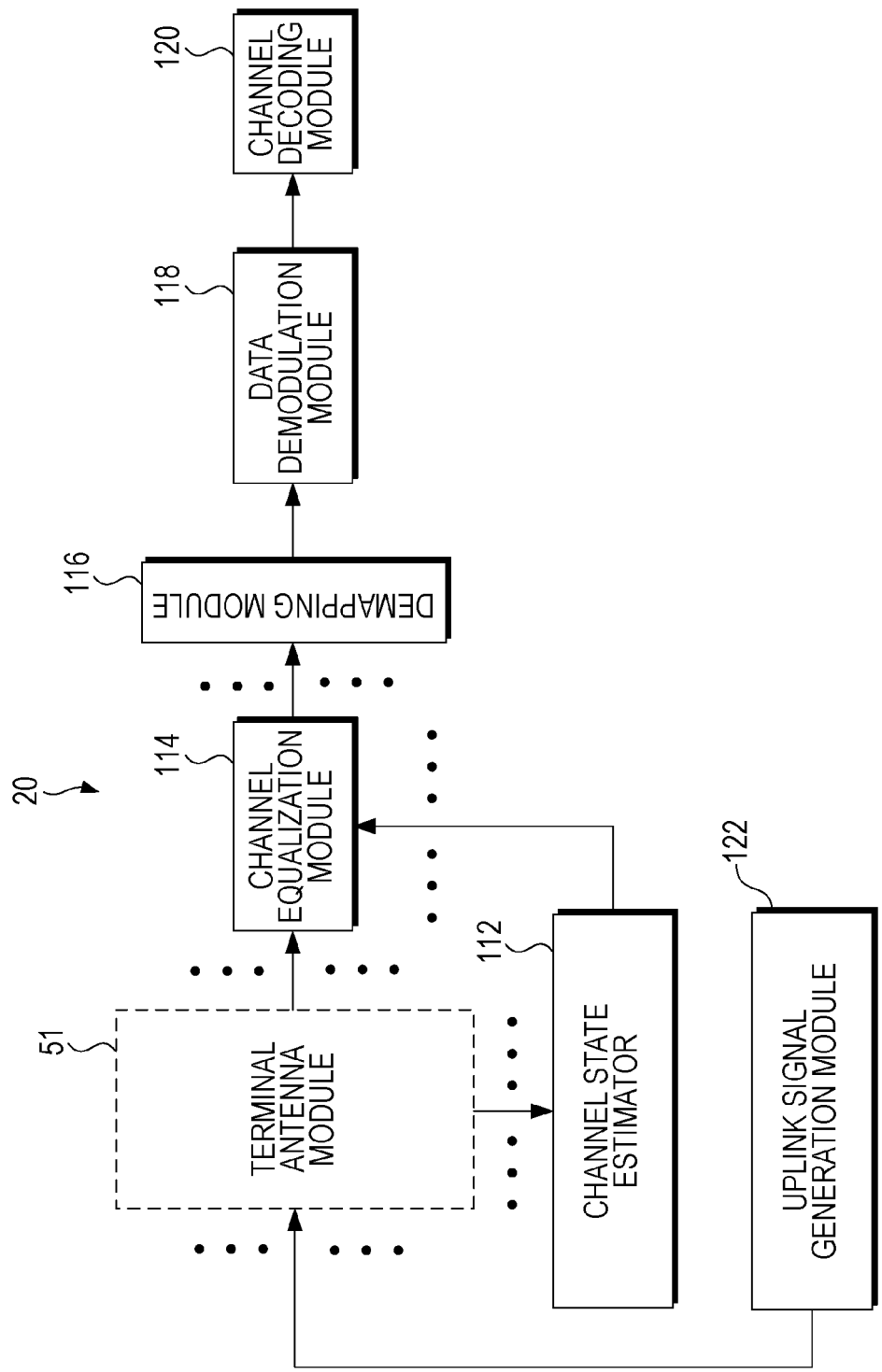
FIG. 10 is a block diagram illustrating a configuration of a terminal device according to the third embodiment of the present invention.
Figure 11:
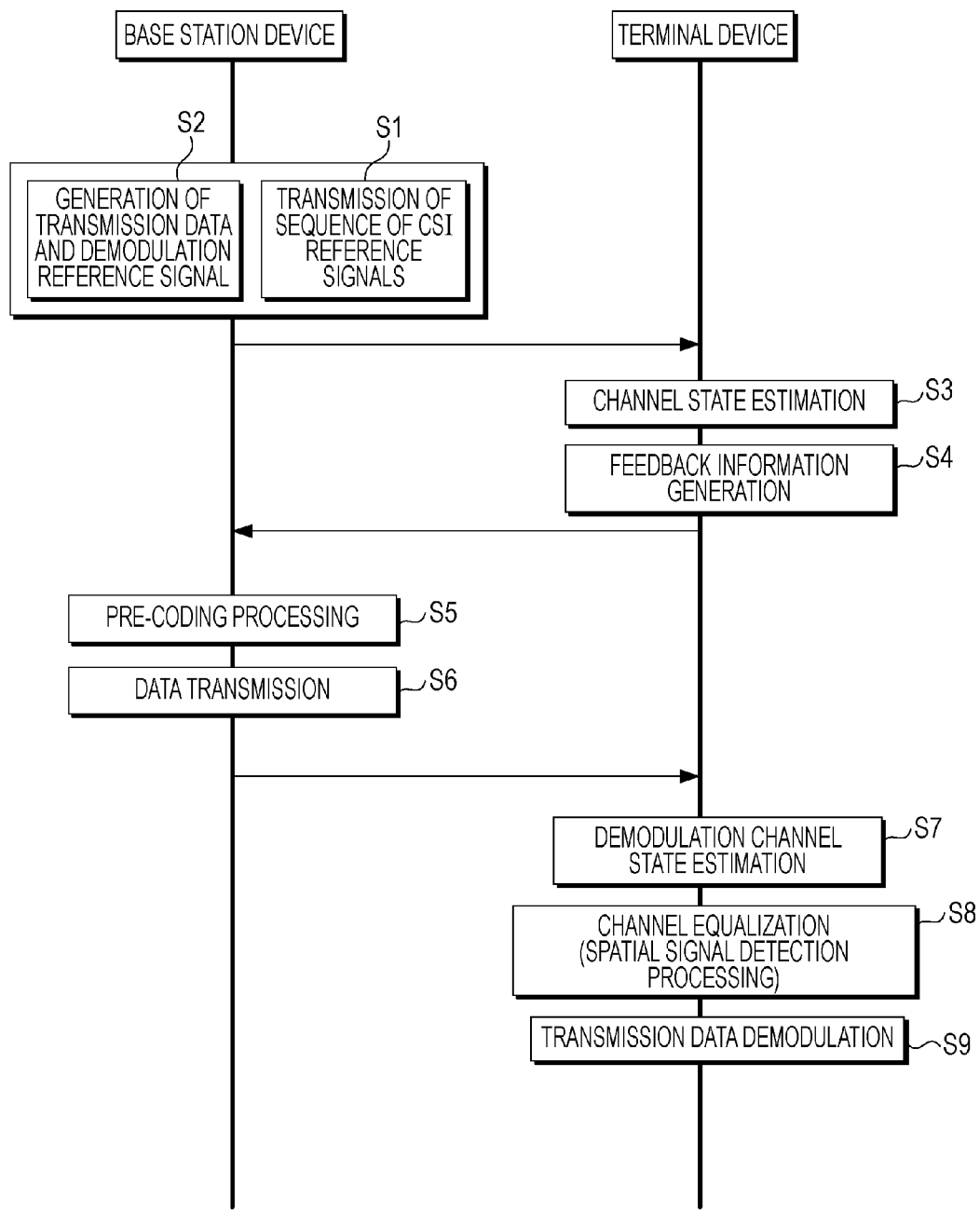
FIG. 11 is a sequence chart illustrating a situation of communication between the base station device that performs pre-coding and the terminal device.
Figure 12:
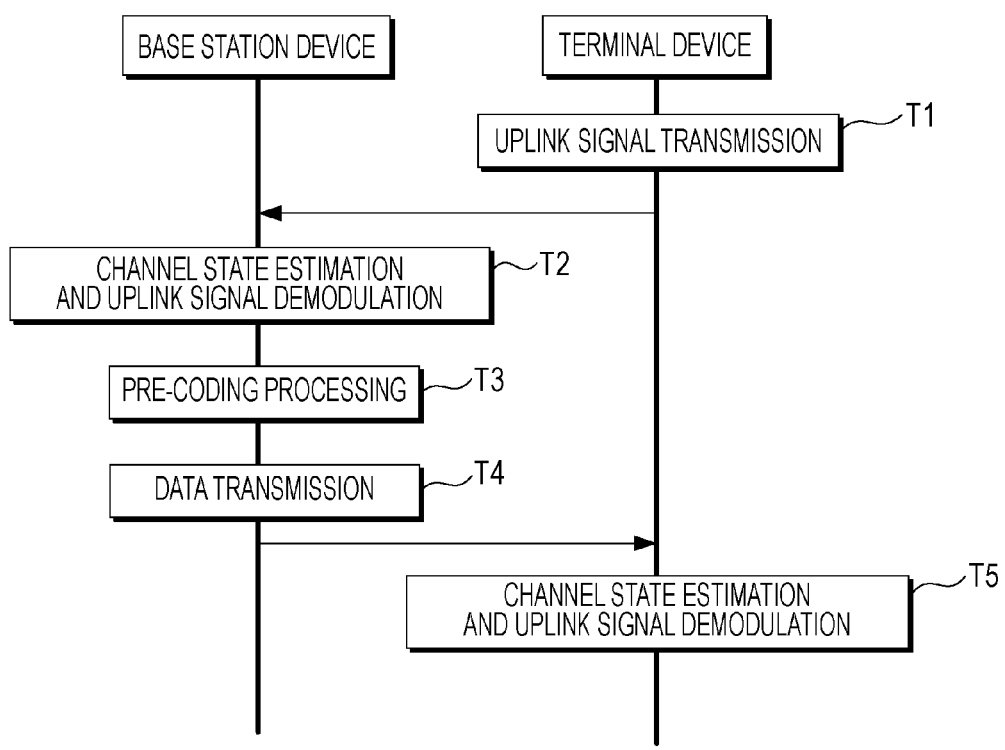
FIG. 12 is a sequence chart illustrating a situation of the communication between the base station device that performs the pre-coding and the terminal device.

FIG. 10 is a block diagram illustrating a configuration of a terminal device according to a third embodiment of the present invention. As illustrated in FIG. 10, a terminal device 20 is configured to include the terminal antenna module 51, a channel state estimator 112, a channel equalization module 114, a demapping module 116, a data demodulation module 118, a channel demodulation module 120, and an uplink signal generation module 122. What is more, the number of receive antennas that the terminal antenna module 51 has is only $N_r$. However, the number of receive antennas is described below as being $N_r=1$.

First, the uplink signal generation module 122 is described. As is the case with the base station device 1-1 described above, according to the present embodiment, the transfer scheme for the uplink has no limitation whatsoever. However, the reference signals that are included in the uplink signals need to be orthogonal or pseudo-orthogonal to one another between the terminal devices 20 that are connected at the same time. Consequently, the uplink signal generation module 122 generates a signal that includes a reference signal that secures orthogonality between the terminal devices 20. In order to secure the orthogonality between the terminal devices 20, control may be performed in such a manner that radio resources with which the reference signal are transmitted are notified from the base station device 1-1, and in such a manner that radio resources that are determined in advance are used at all times. A signal that is generated in the uplink signal generation module 122 is output to the terminal antenna module 51.

A configuration of the terminal antenna module 51 is the same as that in FIG. 6. However, an output from the uplink signal generation module 122 is input to the wireless transmission module 51-2. The wireless transmission module 51-2 converts the signal being input into a signal that is available for the transmission to the base station device 1-1, and then outputs the resulting the signal to the antenna 51-7. The antenna 51-7 transmits the signal being input to the base station device 1-1.

According to the present embodiment, the base station device 1-1 receives the signal that is transmitted by the antenna at the point in time $t_1$, and based on the reference signal that is included in the received signal, the channel state estimator 103 of the base station device 1-1 estimates the CSI at the point in time $t_1$.

Subsequently, the signal processing at the point in time $t_2$, which is performed by each constituent device when the terminal device 20 receives the downlink signal transmitted by the base station device 1-1, is described. Because signal processing of the downlink signal by each constituent device is the same as that according to the first embodiment except for the signal processing by the control information acquisition module 51-6 of the terminal antenna module 51 and the signal processing by the channel state estimator 112 of the terminal device 20, only signal processing by the control information acquisition module 51-6 and signal processing by the channel state estimator 112 are described below.

Input into the control information acquisition module 51-6 is control information associated with the linear filter $w_u$ generated in the linear filter generation module 27-1 of the base station device 1-1, which is generated in the control information generation module 105 of the base station device 1-1. Furthermore, also input into the control information acquisition module 51-6 is control information indicating at which point in time the uplink signal in which the reference signal used in the estimation of the CSI being input into the pre-coding module 27 of the base station device 1-1 is included is transmitted. Based on the two pieces of control information being input, the control information acquisition module 51-6 estimates the linear filter $w_u$ and the point in time $t_1$, and outputs a result of the estimation to the channel state estimator 112.

Input into the channel state estimator 112 are the CSI-RS that is included in the downlink signal, and the linear filter $w_u$ and the point in time $t_1$ that are output from the control information acquisition module 51-6. First, in the channel state estimator 112, the CSI between the terminal device and the base station device 1-1 is estimated based on the CSI-RS and a result of the estimation is stored. Moreover, the channel state estimator 112 also needs to store the CSI that is estimated based on the CSI-RS which is included in the downlink signal received at a different point in time.

Subsequently, in the channel state estimator 112, the channel state information needed for performing the channel equalization in the channel equalization module 114 is estimated based on information relating to the CSI estimated by the CSI-RS, and the linear filter $w_u$ and the point in time $t_1$ notified by the base station device 1-1.

According to the third embodiment, the channel state estimator 112 outputs a value, which results from multiplying the CSI estimated with the CSI-RS that is included in the closest downlink signal to the point in time $t_1$ notified by the base station device 1-1, by the linear filter $w_u$ notified by the base station device 1-1, as the channel estimate, to the channel equalization module 114.

For example, in a case where the transfer is performed based on the frame format that is illustrated in FIG. 8, the terminal device 20 outputs a value, which results from multiplying the CSI estimated based on the CSI-RS that is included in the downlink signal received immediately before the point in time $t_1$, by $w_u$, to the channel equalization module 114.

In the pre-coding module 27 of the base station device 1-1, the pre-coding is performed based on the CSI at the point in time $t_1$. Consequently, based on the CSI at the closest point in time to the point in time $t_1$, the terminal device 20 performs the equalization. Thus, in the same manner as in the first and second embodiments, it is possible to minimize the remaining IUI.

Furthermore, based on multiple pieces of channel state information that are estimated by the channel state estimator 112 before the point in time $t_2$ based on the CSI-RS, the channel state estimator 112 may estimate the channel state information at the point in time $t_1$. In such a case, the estimation may be performed based on a simple polynomial interpolation, and the estimation may be performed based on a least squares norm or a mean square error minimum norm.

Signal processing of the downlink signal by a different terminal device 20 is the same as that according to each of the first and second embodiments, and thus a description thereof is omitted.

According to the third embodiment, focus is on the communication system that uses the TDD in the duplex scheme. According to the present embodiment, in the communication system that uses the TDD, an influence of the remaining IUI that occurs due to the change in channel over time can be suppressed. For this reason, it is possible to improve the channel performance of non-linear MU-MIMO transfer.

(1) Furthermore, the present embodiment is able to adopt the following aspects. That is, the terminal device according to the present embodiment is a terminal device which receives radio signals on which non-linear pre-coding is performed and which are space-multiplexed, from a base station device including multiple antennas, the terminal device including: a channel state estimator that estimates channel state information on a channel between the terminal device and the base station device; a control information acquisition module that acquires a linear filter that is calculated in the base station device; and a channel equalization module that performs channel equalization processing on the radio signals that are received at a first point in time, based on channel state information at a second point in time that precedes the first point in time and on the linear filter.

In this manner, because the channel equalization processing is performed on the radio signals received at the first point in time, based on the channel state information at the second point in time that precedes the first point in time and the linear filter, it is possible to suppress remaining IUI that occurs due to a change in channel over time. Accordingly, in an environment where it is difficult for the change in channel over time to be negligible, it is also possible to perform transfer without causing transmission performance to degrade greatly.

(2) Furthermore, the terminal device according to the present embodiment may further include: a feedback information generation module that generates feedback information which includes the channel state information at the second point in time; and a wireless transmission module that notifies the base station device of the feedback information.

In this manner, because the feedback information that includes the channel state information at the second point in time is generated and the feedback information is notified to the base station device, the base station device performs the non-linear pre-coding based on the channel state information at the second point in time, and the terminal device performs the channel equalization processing on the radio signals received at the first point in time based on the channel state information at the second point in time that precedes the first point in time and on the linear filter. Thus, it is possible to perform processing that suppresses the remaining IUI that occurs due to the change in channel over time.

(3) Furthermore, in the terminal device according to the present embodiment, the wireless transmission module may transmit a reference signal to the base station device.

In this manner, because the reference signal is transmitted to the base station device, it is possible for the base station device to estimate the channel state information.

(4) Furthermore, in the terminal device according to the present embodiment, the channel equalization module may perform channel equalization processing on the radio signals received at the first point in time, based on a channel gain at the second point in time between the terminal device and the base station device and on a channel estimate that is obtained from the linear filter calculated in the base station device.

In this manner, because the channel equalization processing is performed on the radio signals received at the first point in time based on the channel gain at the second point in time between the terminal device and the base station device and on the channel estimate that is obtained from the linear filter calculated in the base station device, it is possible to suppress the remaining IUI that occurs due to the change in channel over time.

(5) Furthermore, in the terminal device according to the present embodiment, the linear filter may be calculated based on the channel state information at the second point in time.

In this manner, because the linear filter is calculated based on the channel state information at the second point in time, the base station device performs the non-linear pre-coding based on the channel state information at the second point in time, and the terminal device performs the channel equalization processing on the radio signals received at the first point in time based on the channel state information at the second point in time that precedes the first point in time and on the linear filter. Thus, it is possible to perform processing that suppresses the remaining IUI that occurs due to the change in channel over time.

(6) Furthermore, the terminal device according to the present embodiment is a terminal device that receives radio signals on which non-linear pre-coding is performed and which are space-multiplexed, from a base station device including multiple antennas, the terminal device including: a channel state estimator that estimates channel state information on a channel between the terminal device and the base station device; a control information acquisition module that acquires a linear filter that is calculated in the base station device; and a channel equalization module that performs channel equalization processing on the radio signals received from the base station device, based on channel state information that is the same as the channel state information used in the calculation of the linear filter in the base station device and on the linear filter.

In this manner, because the channel equalization processing is performed on the radio signals received from the base station device based on the channel state information that is the same as the channel state information used in the calculation of the linear filter in the base station device and on the linear filter, it is possible to suppress the remaining IUI that occurs due to the change in channel over time.

Accordingly, in the environment where it is difficult for the change in channel over time to be negligible, it is also possible to perform the transfer without causing the transmission performance to degrade greatly.

(7) Furthermore, the base station device according to the present embodiment is a base station device that includes multiple antennas and that transmits radio signals on which non-linear pre-coding is performed and which are space-multiplexed, to the multiple terminal devices according to any one of (1) to (6) at a first point in time, the base station device including: a non-linear pre-coding module that performs non-linear pre-coding on a signal that is transmitted to each of the terminal devices based on channel state information at a second point in time that precedes the first point in time; a control information generation module that generates control information which includes information indicating a linear filter; and a transmission module that transmits the radio signals and the control information to each of the terminal devices.

In this manner, because based on the channel state information at the second point in time that precedes the first point in time, the non-linear pre-coding is performed on the signal that is transmitted to each of the terminal devices, the control information that includes the information indicating the linear filter is generated, and the radio signals and the control information are transmitted to each of the terminal devices, the terminal device performs the channel equalization processing on the radio signals received at the first point in time based on the channel state information at the second point in time that precedes the first point in time and on the linear filter. Thus, it is possible to perform the processing that suppresses the remaining IUI that occurs due to the change in channel over time.

(8) Furthermore, the base station device according to the present embodiment may further include: an acquisition module that acquires feedback information which includes channel state information at the second point in time; and a channel state information acquisition module that acquires the channel state information at the second point in time from the feedback information, in which the non-linear pre-coding module may perform the non-linear pre-coding on the signal that is transmitted to each of the terminal devices, based on the channel state information at the second point in time.

In this manner, because the feedback information that includes the channel state information at the second point in time is acquired, the channel state information at the second point in time is acquired from the feedback information, and based on the channel state information at the second point in time, the non-linear precoding is performed on the signal that is transmitted to each of the terminal devices, the terminal device performs the channel equalization processing on the radio signals received at the first point in time based on the channel state information at the second point in time that precedes the first point in time and on the linear filter. Thus, it is possible to perform the processing that suppresses the remaining IUI that occurs due to the change in channel over time.

(9) Furthermore, the base station device according to the present embodiment may further include: a reception module that, at the second point in time, receives a radio signal that includes a reference signal from the terminal device; and a reference signal separation module that separates the reference signal from the received radio signal; and an estimator that estimates channel state information on a channel between the base station device and the terminal device at the second point in time based on the reference signal, in which the non-linear pre-coding module may perform the non-linear pre-coding on a signal that is transmitted to each of the terminal devices based on the channel state information on the channel between the base station device and the terminal device at the second point in time.

In this manner, because the non-linear pre-coding is performed on the signal that is transmitted to the terminal device based on the channel state information on the channel between the base station device and the terminal device at the second point in time, the terminal device performs the channel equalization processing on the radio signals received at the first point in time based on the channel state information at the second point in time that precedes the first point in time and on the linear filter. Thus, it is possible to perform the processing that suppresses the remaining IUI that occurs due to the change in channel over time.

(10) Furthermore, the wireless communication system according to the present embodiment is a wireless communication system including the terminal device according to (1) and the base station device according to (7).

With this configuration, because the channel equalization processing is performed on the radio signals received at the first point in time, based on the channel state information at the second point in time that precedes the first point in time and the linear filter, it is possible to suppress the remaining IUI that occurs due to the change in channel over time. Accordingly, in the environment where it is difficult for the change in channel over time to be negligible, it is also possible to perform the transfer without causing the transmission performance to degrade greatly.

(11) Furthermore, the reception method according to the present embodiment is a reception method for use in a terminal device that receives radio signals on which non-linear pre-coding is performed and which are space-multiplexed, from a base station device including multiple antennas, the reception method at least including: a step of estimating channel state information on a channel between the terminal device and the base station device; a step of acquiring a linear filter that is calculated in the base station device; and a step of performing channel equalization processing on the radio signals that are received at a first point in time, based on channel state information at a second point in time that precedes the first point in time and on the linear filter.

In this manner, because the channel equalization processing is performed on the radio signals received at the first point in time based on the channel state information at the second point in time that precedes the first point in time and the linear filter, it is possible to suppress the remaining IUI that occurs due to the change in channel over time. Accordingly, in the environment where it is difficult for the change in channel over time to be negligible, it is also possible to perform the transfer without causing the transmission performance to degrade greatly.

(12) Furthermore, the integrated circuit according to the present embodiment is an integrated circuit that is built into a terminal device and thus causes the terminal device to perform multiple functions, the circuit causing the terminal device to perform a series of functions including: a function of receiving radio signals on which non-linear pre-coding is performed and which are space-multiplexed, from a base station device including multiple antennas; a function of estimating channel state information on a channel between the terminal device and the base station device; a function of acquiring a linear filter that is calculated in the base station device; and a function of performing channel equalization processing on the radio signals that are received at a first point in time, based on channel state information at a second point in time that precedes the first point in time and on the linear filter.

In this manner, because the channel equalization processing is performed on the radio signals received at the first point in time, based on the channel state information at the second point in time that precedes the first point in time and the linear filter, it is possible to suppress the remaining IUI that occurs due to the change in channel over time. Accordingly, in the environment where it is difficult for the change in channel over time to be negligible, it is also possible to perform the transfer without causing the transmission performance to degrade greatly.

Common to All Embodiments

The embodiments according to the present invention are described above in detail referring to the drawings, but the specific configuration is not limited to the embodiments and a design and the like within a scope not deviating from the gist of the present invention fall within a scope of claims.

Moreover, the present invention is not limited to the embodiments described above. Furthermore, application of the terminal device 2 and the terminal device 20 according to the embodiment is not limited to mobile station devices such as a cellular system. It goes without saying that the terminal device 2 and the terminal device 20 can be applied to a stationary-type electronic apparatus that is installed indoors or outdoors, or a non-movable-type electronic apparatus, for example, an AV apparatus, a kitchen apparatus, a cleaning or washing machine, an air-conditioning apparatus, an office apparatus, a vending machine, and other household apparatuses.

A program running on the mobile station device and the base station device according to the present invention is a program (a program for causing a computer to operate) that controls a CPU and the like in such a manner as to realize the functions according to the embodiment of the present invention. Then, pieces of information that are handled in these apparatuses are temporarily stored in a RAM while being processed. Thereafter, the pieces of information are stored in various ROMs or HDDs, and as needed, are read by the CPU to be modified or written. As a recording medium on which to store the program, among a semiconductor medium (for example, a ROM, a nonvolatile memory card, and the like), an optical storage medium (for example, a DVD, an MO, an MD, a CD, a BD, and the like), a magnetic storage medium (for example, a magnetic tape, a flexible disk, and the like), and the like, any one may be possible. Furthermore, in some cases, the functions according to the embodiment described above are realized by running the loaded program, and in addition, the functions according to the present invention are realized in conjunction with an operating system or other application programs, based on an instruction from the program.

Furthermore, in a case where the programs are distributed on the market, the program stored on a portable recording medium can be distributed or the program can be transmitted to a server computer that connects through a network such as the Internet. In this case, a storage device in the server computer also is included in the present invention. Furthermore, some or all of the portions of the mobile station device and the base station device according to the embodiment described above may be realized as an LSI that is a typical integrated circuit. Each functional block of the mobile station device and the base station device may be individually realized as a processor, and some of, or all of the functional blocks may be integrated into a processor. Furthermore, a technique of the integrated circuit is not limited to the LSI, and an integrated circuit for the functional block may be realized with a dedicated circuit or a general-purpose processor. Furthermore, if with advances in a semiconductor technology, a circuit integration technology with which an LSI is replaced appears, it is also possible to use an integrated circuit to which such a technology is applied.

REFERENCE SIGN LIST 1, 1-1 BASE STATION DEVICE
2-1 TO 2-4, 20 TERMINAL DEVICE
21 CHANNEL CODING MODULE
23 DATA MODULATION MODULE
25 MAPPING MODULE
27 PRE-CODING MODULE
27-1 LINEAR FILTER GENERATION MODULE
27-2 PERTURBATION VECTOR SEARCH MODULE
27-3 TRANSMISSION SIGNAL GENERATION MODULE
29 ANTENNA MODULE
29-1 IFFT MODULE
29-2 GI INSERTION MODULE
29-3 WIRELESS TRANSMISSION MODULE
29-4 WIRELESS RECEPTION MODULE
29-5 ANTENNA
31 CONTROL INFORMATION ACQUISITION MODULE
33 CHANNEL STATE INFORMATION ACQUISITION MODULE
35 CONTROL INFORMATION GENERATION MODULE
51 TERMINAL ANTENNA MODULE
51-1 WIRELESS RECEPTION MODULE
51-2 WIRELESS TRANSMISSION MODULE
51-3 GI REMOVAL MODULE
51-4 FFT MODULE
51-5 REFERENCE SIGNAL SEPARATION MODULE
51-6 CONTROL INFORMATION ACQUISITION MODULE
51-7 ANTENNA
53 CHANNEL STATE ESTIMATOR
55 FEEDBACK INFORMATION GENERATION MODULE
57 CHANNEL EQUALIZATION MODULE
59 DEMAPPING MODULE
61 DATA DEMODULATION MODULE
63 CHANNEL DEMODULATION MODULE
73 CHANNEL STATE ESTIMATOR
75 FEEDBACK INFORMATION GENERATION MODULE
91 CHANNEL CODING MODULE
93 DATA MODULATION MODULE
95 MAPPING MODULE
101 REFERENCE SIGNAL SEPARATION MODULE
103 CHANNEL STATE ESTIMATOR
105 CONTROL INFORMATION GENERATION MODULE
112 CHANNEL STATE ESTIMATOR
114 CHANNEL EQUALIZATION MODULE
116 MAPPING MODULE
118 DATA DEMODULATION MODULE
120 CHANNEL DEMODULATION MODULE
122 UPLINK SIGNAL GENERATION MODULE

The invention claimed is:

1. A terminal device that receives radio signals on which pre-coding is performed and which are space-multiplexed, from a base station device including multiple antennas, the terminal device comprising:
   circuitry; and
   a memory associated with the circuitry; wherein
   the circuitry estimates channel state information on a channel between the terminal device and the base station device;
   the circuitry acquires a linear filter that is calculated in the base station device;
   the circuitry performs channel equalization processing on the radio signals that are received at a first point in time, based on the channel state information at a second point in time that precedes the first point in time and on the linear filter;
   the circuitry generates feedback information which includes the channel state information at the second point in time;
   the circuitry notifies the base station device of the feedback information;
   the circuitry transmits a reference signal to the base station device; and
   the circuitry performs channel equalization processing on the radio signals received at the first point in time, based on a channel gain at the second point in time between the terminal device and the base station device and on a channel estimate that is obtained from the linear filter calculated in the base station device.

2. The terminal device according to claim 1,
   wherein the linear filter is calculated based on the channel state information at the second point in time.

3. A base station device that transmits radio signals on which non-linear pre-coding is performed and which are space-multiplexed, to multiple terminal devices, the base station device comprising:
   multiple antennas;
   circuitry; and
   a memory associated with the circuitry; wherein
   the circuitry performs non-linear pre-coding on a signal that is transmitted to each of the terminal devices based on channel state information at a second point in time that precedes the first point in time;
   the circuitry generates control information which includes information indicating a linear filter;
   the circuitry transmits the radio signals and the control information to each of the terminal devices;
   the circuitry acquires feedback information which includes channel state information at the second point in time;
   the circuitry acquires the channel state information at the second point in time from the feedback information; and
   the circuitry performs the non-linear pre-coding on the signal that is transmitted to each of the terminal devices, based on the channel state information at the second point in time.

4. The base station device according to claim 3, wherein
   at the second point in time, the circuitry receives a radio signal that includes a reference signal from the terminal device;
   the circuitry separates the reference signal from the received radio signal;
   the circuitry that estimates channel state information on a channel between the base station device and the terminal device at the second point in time based on the reference signal; and the circuitry performs the non-linear pre-coding on a signal that is transmitted to each of the terminals devices based on the channel state information on the channel between the base station device and the terminal device at the second point in time.

5. A reception method for use in a terminal device that receives radio signals on which non-linear pre-coding is performed and which are space-multiplexed, from a base station device including multiple antennas, the reception method at least comprising:
- a step of estimating channel state information on a channel between the terminal device and the base station device;
- a step of acquiring a linear filter that is calculated in the base station device; and
- a step of performing channel equalization processing the radio signals that are received at a first point in time, based on the channel state information at a second point in time that precedes the first point in time and on the linear filter;
- a step of generating feedback information which includes the channel state information at the second point in time;
- a step of notifying the base station device of the feedback information;
- a step of transmitting a reference signal to the base station device; and
- a step of performing channel equalization processing on the radio signals received at the first point in time, based on a channel gain at the second point in time between the terminal device and the base station device and on a channel estimate that is obtained from the linear filter calculated in the base station device.

* * * * *